(12) United States Patent
Otsuka et al.

(10) Patent No.: US 8,718,099 B2
(45) Date of Patent: May 6, 2014

(54) TRANSMISSION APPARATUS, TRANSMISSION METHOD, RECEPTION APPARATUS, AND RECEPTION METHOD

(75) Inventors: Keitaro Otsuka, Yokohama (JP); Takeshi Inoue, Yokohama (JP); Kazuya Kitasako, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 28 days.

(21) Appl. No.: 13/301,592

(22) Filed: Nov. 21, 2011

(65) Prior Publication Data

US 2012/0195328 A1  Aug. 2, 2012

(30) Foreign Application Priority Data

Jan. 28, 2011  (JP) ................... 2011-016180

(51) Int. Cl.
*H04J 4/00* (2006.01)
(52) U.S. Cl.
USPC ........... 370/478; 370/328; 370/342; 370/491; 370/310
(58) Field of Classification Search
USPC ............ 370/478, 476, 328, 310, 342, 491; 375/340, 349, 348, 343, 267
See application file for complete search history.

(56) References Cited

U.S. PATENT DOCUMENTS

| | | | |
|---|---|---|---|
| 4,736,370 A * | 4/1988 | Hirome et al. ............... 370/428 |
| 7,382,832 B2 * | 6/2008 | Magee et al. ................ 375/267 |
| 7,936,289 B2 * | 5/2011 | Bae et al. ...................... 341/58 |
| 7,995,680 B2 | 8/2011 | Wang et al. |
| 8,045,657 B2 * | 10/2011 | Xiang ........................... 375/344 |
| 8,331,480 B2 * | 12/2012 | Zheng et al. ................. 375/295 |
| 8,374,259 B2 * | 2/2013 | Yamasuge .................... 375/260 |
| 2007/0211785 A1 * | 9/2007 | Nakache et al. ............. 375/136 |
| 2009/0190686 A1 * | 7/2009 | Cheong et al. ............... 375/267 |
| 2009/0305693 A1 * | 12/2009 | Shimomura et al. ........ 455/422.1 |
| 2010/0027723 A1 * | 2/2010 | Kim et al. .................... 375/343 |
| 2011/0013547 A1 * | 1/2011 | Liao et al. .................... 370/310 |

FOREIGN PATENT DOCUMENTS

| | | |
|---|---|---|
| JP | 2008-236744 | 10/2008 |
| JP | 2009-135866 A | 6/2009 |

* cited by examiner

*Primary Examiner* — Rasheed Gidado
(74) *Attorney, Agent, or Firm* — Fujitsu Patent Center

(57) ABSTRACT

A transmission apparatus for converting a transmission data series into frequency-domain, converting the frequency-domain converted signal into time-domain signal, and transmitting the time-domain converted signal, the apparatus including: a preamble pattern generation unit which outputs at least two preamble patterns among second and third preamble patterns, including bit series in which each of bits of a first preamble pattern is continued for n bits (where n is an integer equal to or greater than 2) and for k bits (where k is an integer equal to or greater than 2, and k≠n), and the first preamble pattern; and a transmission unit which transmits the transmission signal including at least two of the preamble patterns output from the preamble pattern generation unit.

14 Claims, 21 Drawing Sheets

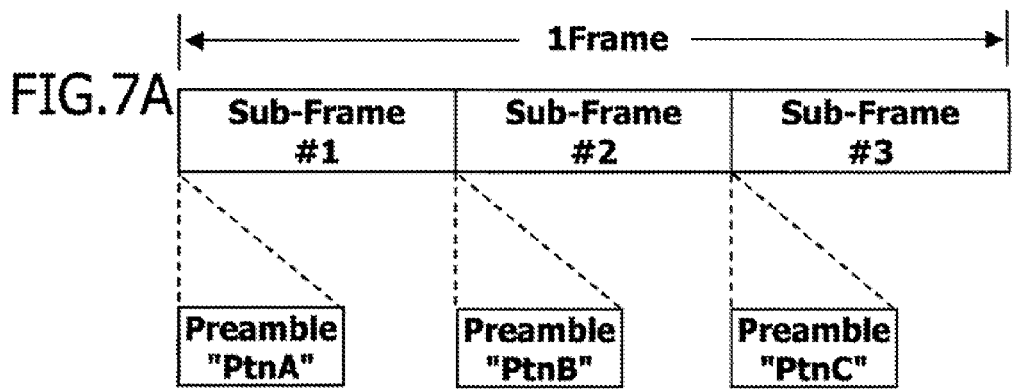
FIG.7A
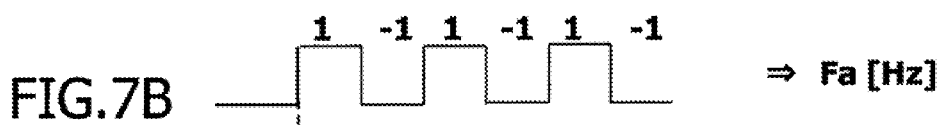
FIG.7B ⇒ Fa [Hz]
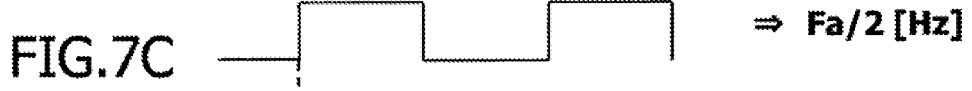
FIG.7C ⇒ Fa/2 [Hz]
FIG.7D ⇒ Fa/3 [Hz]

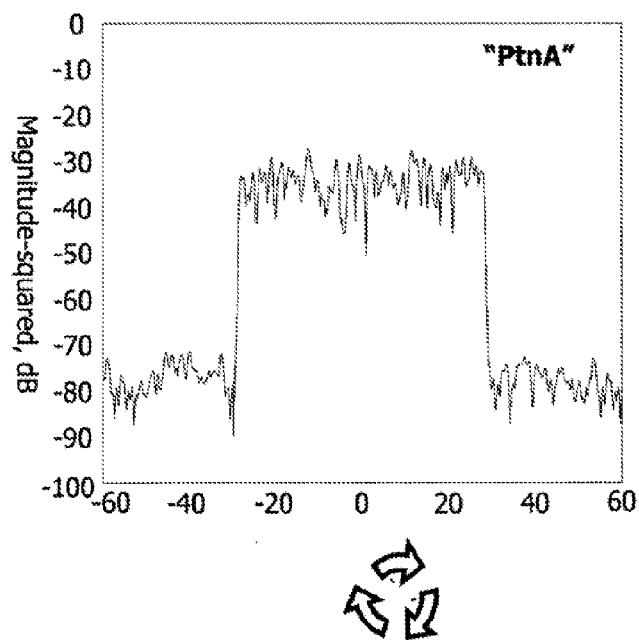
FIG.8A
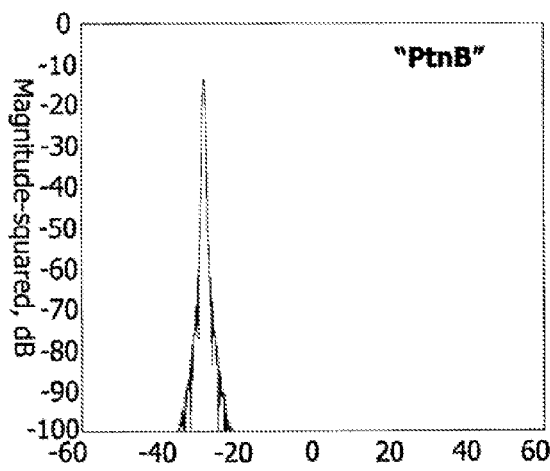
FIG.8B
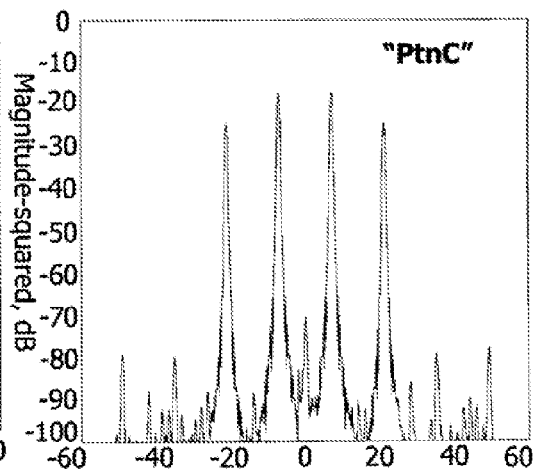
FIG.8C

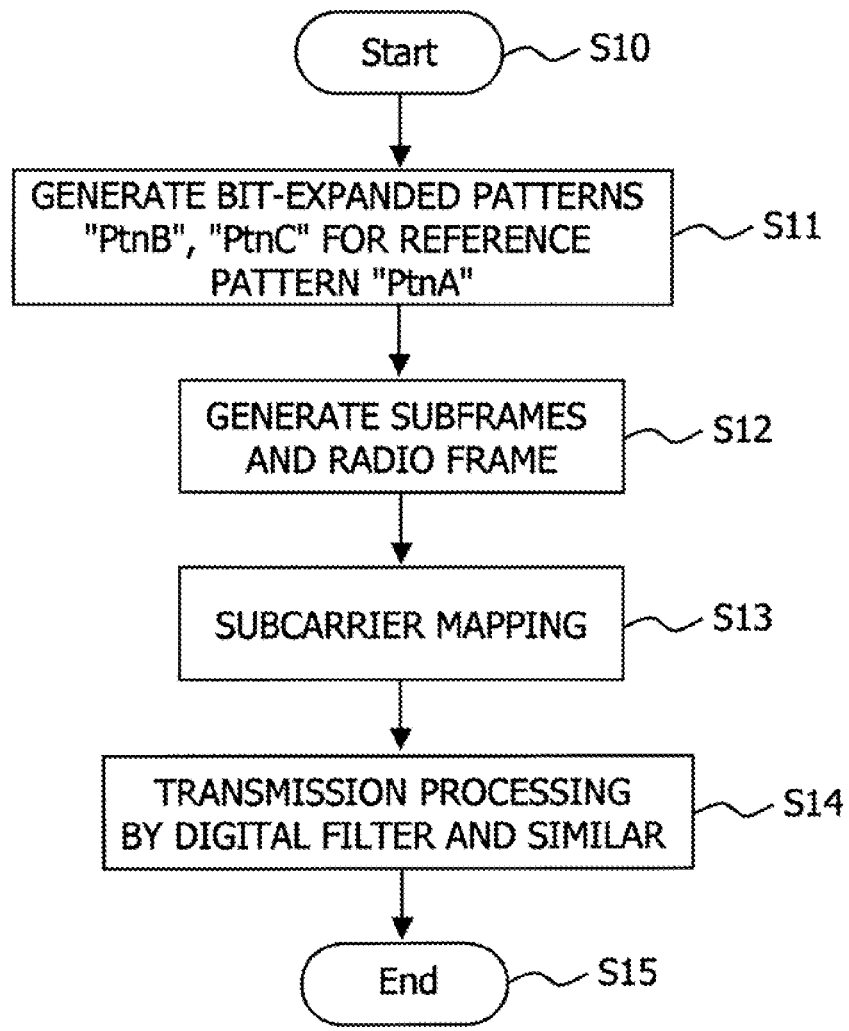

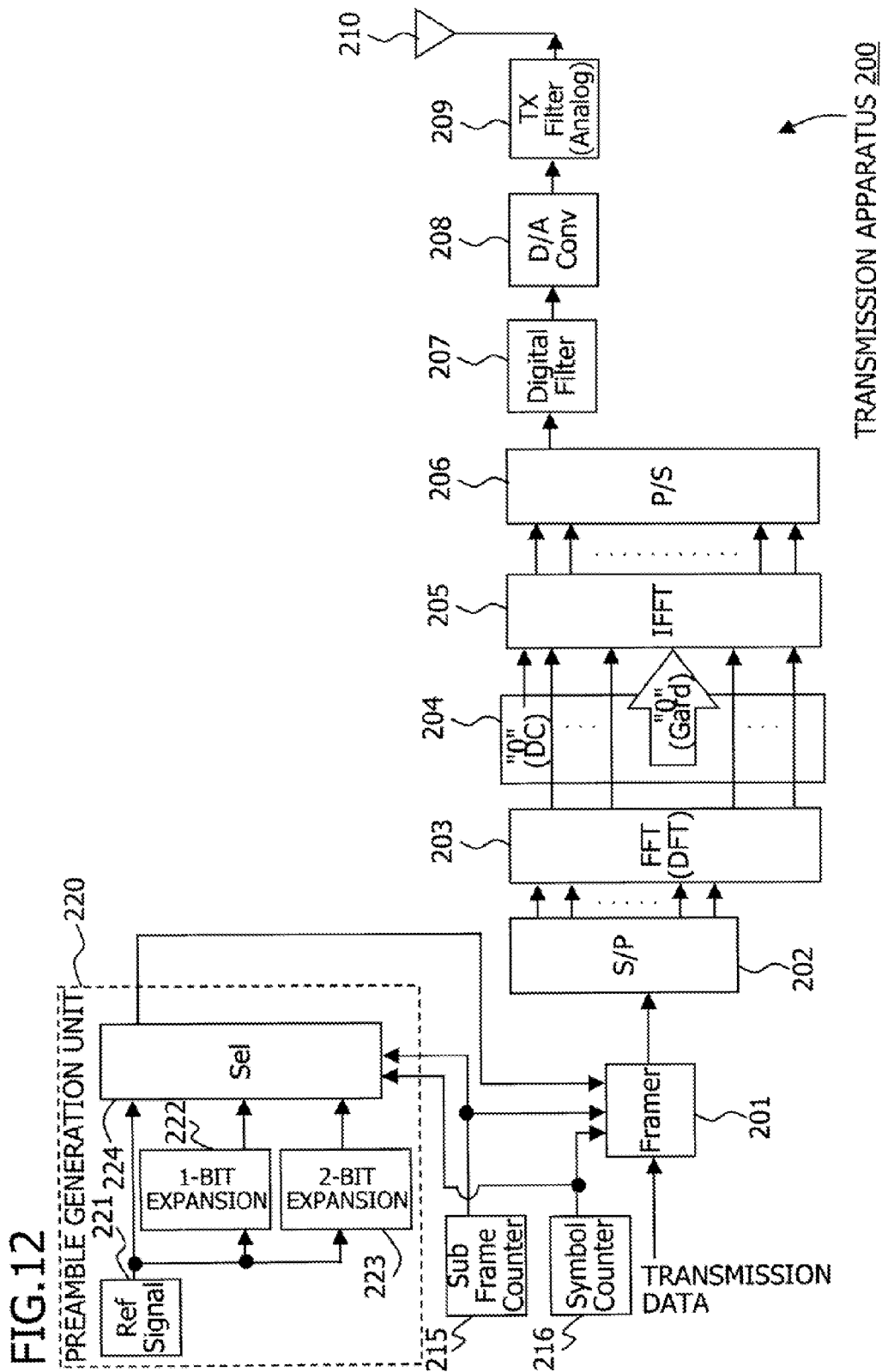

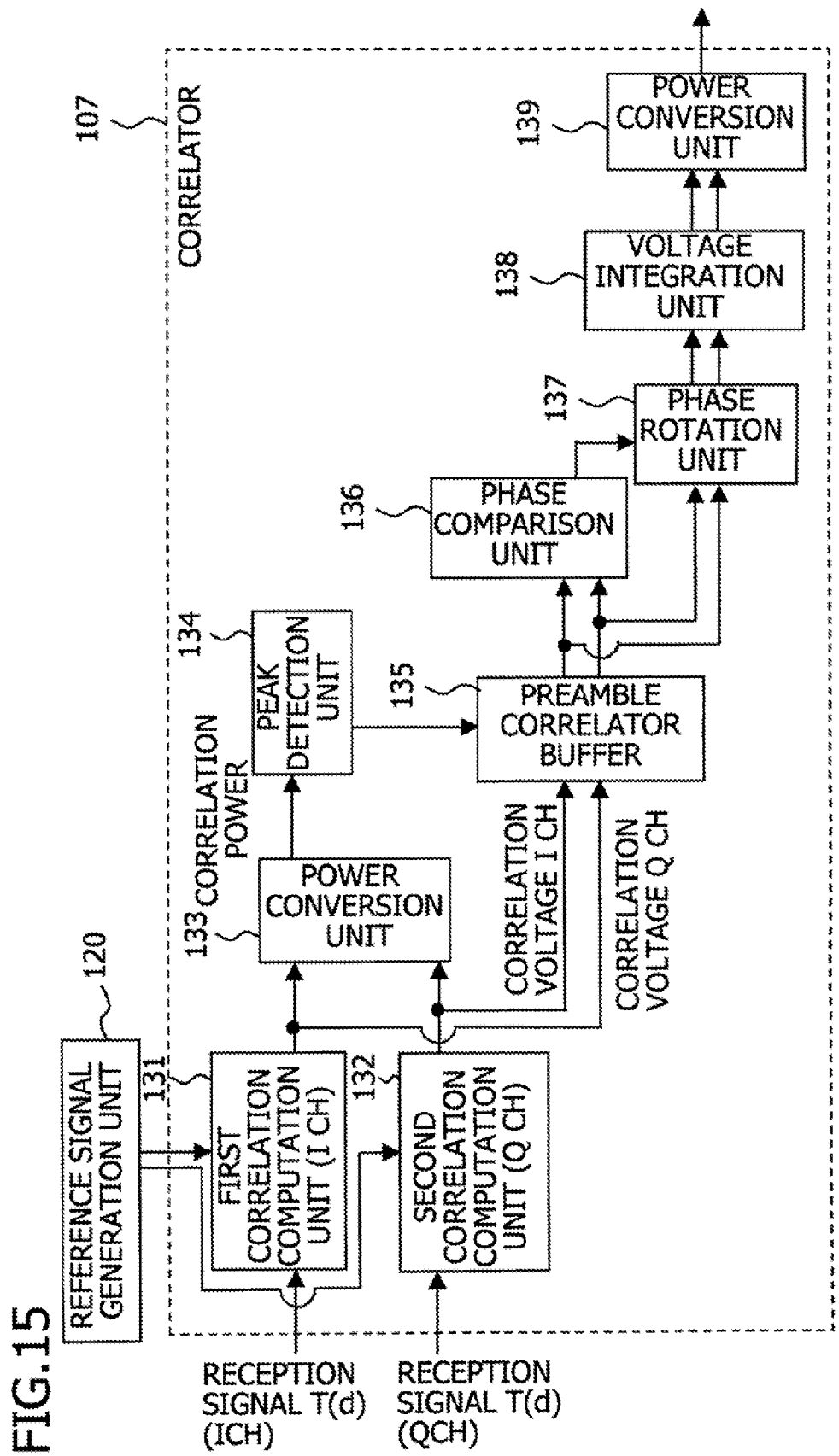

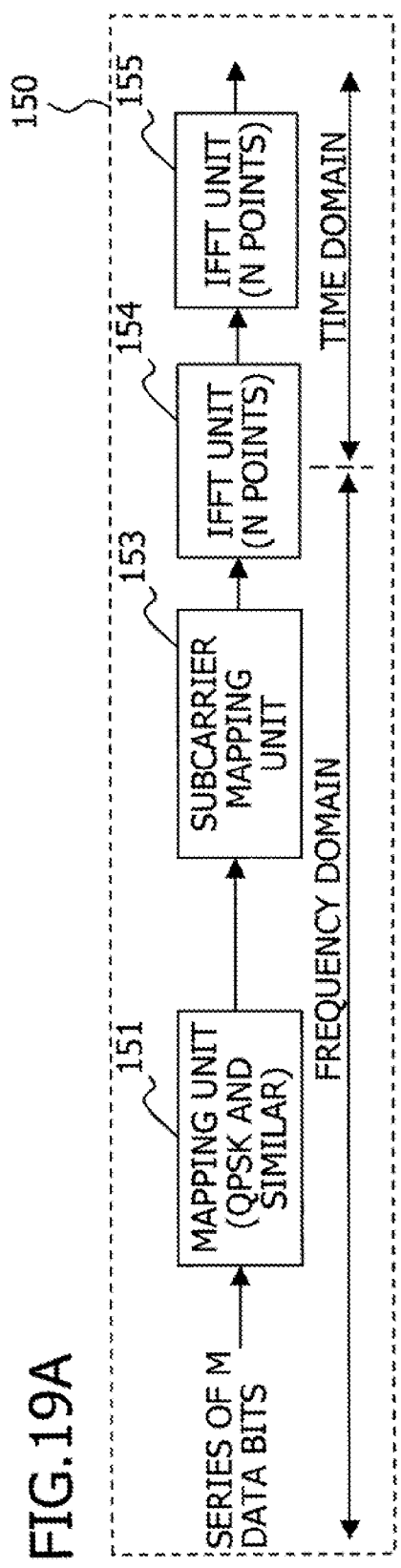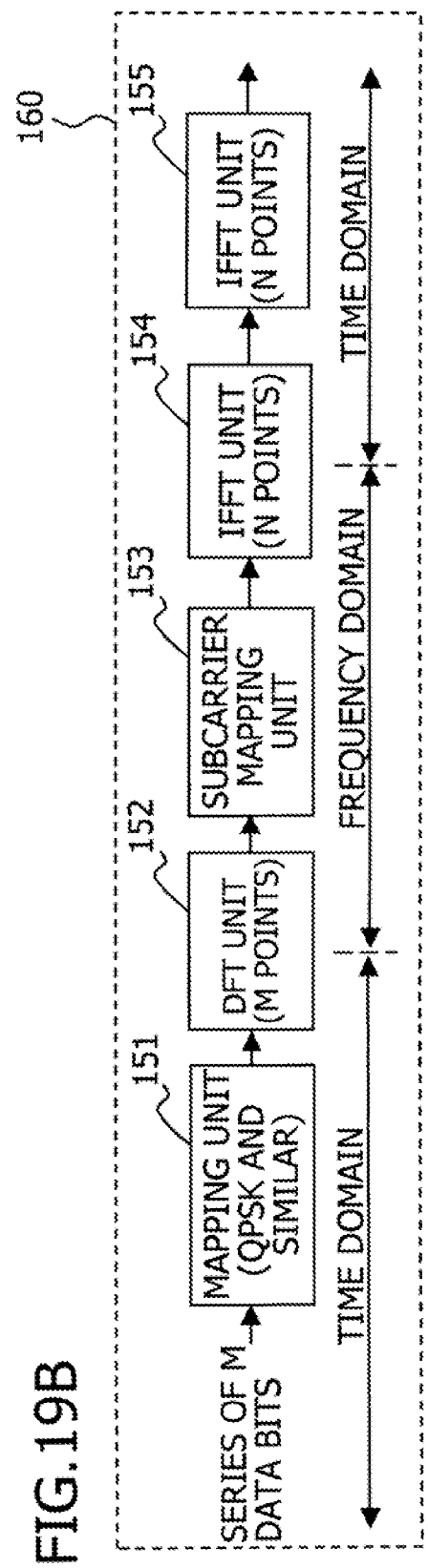

TRANSMISSION APPARATUS, TRANSMISSION METHOD, RECEPTION APPARATUS, AND RECEPTION METHOD

CROSS-REFERENCE TO RELATED APPLICATION

This application is based upon and claims the benefit of priority of the prior Japanese Patent Application No. 2011-016180, filed on Jan. 28, 2011, the entire contents of which are incorporated herein by reference.

FIELD

The embodiments discussed herein are related to a transmission apparatus, transmission method, reception apparatus, and reception method.

BACKGROUND

At present, radio communication systems such as portable telephone systems and wireless LANs (Local Area Networks) are in widespread use. And in the field of radio communication, next-generation radio communication technologies are being continuously and actively discussed as means of further improving communication speeds and capacities.

The OFDM (Orthogonal Frequency Division Multiplexing) method is one communication method among such radio communication technologies. FIG. 19A illustrates an example of the configuration of a transmission apparatus 150 using the OFDM method. In the OFDM method of communication, for example a frequency band is divided into a plurality of frequency bands (or subcarriers), and information data or similar is mapped to orthogonal frequency bands and transmitted. Hence compared with other methods, OFDM has the characteristic of superior efficiency of frequency utilization. However, in the OFDM method, random information data on the frequency axis is subjected to IFFT (Inverse Fast Fourier Transform) processing to generate time-axis signal. For this reason, compared with other communication methods, OFDM has the characteristic of a high PAPR (Peak to Averaged Power Ratio).

The SC-OFDM (Single Carrier OFDM) is another communication method which is attracting attention. FIG. 19B illustrates an example of the configuration of a transmission apparatus 160 using the SC-OFDM method. The SC-OFDM method is a communication method in which for example a frequency band is divided, and different frequency bands are used for transmission between a plurality of terminals. The SC-OFDM method has smaller amplitude fluctuation of time-axis signal compared with the OFDM method, and the PAPR can be lowered. Hence a transmission apparatus 160 using the SC-OFDM method can reduce power consumption compared with a transmission apparatus 150 using the OFDM method.

Whether OFDM or SC-OFDM is used, such transmission apparatuses 150 and 160 transmit transmission signal, including preamble signal and a plurality of data signal, as radio frames to a reception apparatus. Among these, preamble signal include a bit pattern which is known by both the transmission apparatus 150, 160 and the reception apparatus, and for example is used in reception synchronization in the reception apparatus. For example, the reception apparatus detects the correlation peak power in the preamble section, and establishes reception synchronization with reference to the time of detection of the correlation peak power. FIG. 20A illustrates an example of correlation power in a preamble section, measured in a reception apparatus. In FIG. 20A, the horizontal axis represents time and the vertical axis represents correlation power. In this example, there are three symbols' worth of preamble signal in one radio frame; consequently, in FIG. 20A there are three portions which are correlation peak powers. The reception apparatus for example extracts the times at which the difference between the correlation peak power and the second large correlation power is equal to or above a threshold value, or is equal to the correlation peak power, and establishes reception synchronization with this time as reference.

The following are two such preamble-related techniques. Regarding preamble patterns, by transmitting two sub-patterns, which are "P2" and a pattern "−P2" with phase inverted relative to "P2", when using a single-carrier method to realize MIMO (Multiple-Input and Multiple-Output) transmission, increases in the preamble interval are suppressed.

Further, there are apparatuses in similar in which, by using cross-correlation characteristics of preamble codes and auto-correlation determination to identify a preamble code, and estimating integer carrier frequency offsets, preamble codes can be detected quickly and correctly even in an environment in which there are carrier frequency offsets.
Japanese Laid-open Patent Publication No. 2009-135866
Japanese Laid-open Patent Publication No. 2008-236744

A radio signal transmitted from transmission apparatuses 150, 160 may be received by a reception apparatus via a plurality of transmission paths due to reflection by buildings and similar. The radio signal propagating on a plurality of different transmission paths undergo interference, and at the reception apparatus the reception strength of radio signal may fluctuate considerably. Such a phenomenon is sometimes called multipath fading. In a multipath fading radio communication environment, a particular subcarrier or frequency may be affected by multipath fading. FIG. 21 illustrates an example of the frequency spectrum of reception signal in a reception apparatus; the horizontal axis represents frequency and the vertical axis represents reception power. In FIG. 21, frequencies indicated by arrows have reduced reception power compared with elsewhere, and are affected by multipath fading.

On the other hand, in the case of the OFDM method, data patterns are mapped to each subcarrier in the frequency domain (see for example FIG. 19A), so that data is mapped over all subcarriers at system frequencies, and transmission power is substantially the same in system frequency bands. Hence in the case of the OFDM method, the transmission spectrum does not depend on the data pattern.

However, in the case of the SC-OFDM method, processing for conversion into the frequency domain by DFT processing is included (see for example FIG. 19B), and so in subcarriers after conversion there are cases in which subcarriers to which data is not mapped also exist. In such cases, the transmission power is not the same over all frequency bands, and the transmission spectrum depends on the data pattern. Hence in the case of the SC-OFDM method, depending on the preamble pattern, power peaks may occur in specific subcarriers, and there exist patterns for which power is unevenly distributed in specific subcarriers.

When such a subcarrier is for example affected by multipath fading, the correlation power characteristic of the preamble section is also affected. For example, in a subcarrier affected by multipath fading in the reception spectrum of FIG. 20, the correlation power characteristic of a preamble pattern such that the transmission spectrum power peaks or similar will be affected. In such cases, it may happen that for example the correlation power for the preamble section does not reach a presumed correlation peak power, or the correlation peak power may be detected with a timing other than the timing at which the correlation peak power is normally obtained. FIG. 20B illustrates an example of the correlation power in the preamble section in a case where the power is affected by multipath fading. In the case of FIG. 20B, the difference between the correlation peak power and the second correlation power is smaller than a threshold value, or is smaller than the case in which the correlation peak power is as in FIG. 20A. In such cases, the reception apparatus may not use the timing of the correlation peak power as reference, and reception synchronization may not be established based on the preamble pattern.

Further, in the above-described technique of sending a preamble employing two sub-patterns with phase inverted, only phase inversion is performed, and transmission employs the SC-OFDM method, so that in some cases power is unevenly distributed in particular subcarriers. Hence when using this technique as well, there are cases in which, because both of two sub-patterns are affected by multipath fading, the correlation characteristic of the preamble section is affected.

Further, even in the case of a technique for estimating an integer carrier frequency offset, a known preamble pattern is transmitted without modification, so that when transmission uses the SC-OFDM method, power is distributed unevenly to particular subcarriers and similar, and there are cases in which multipath fading has an effect.

Hence whatever the technique used, a particular subcarrier is affected by multipath fading in the preamble section, and there are cases in which reception synchronization cannot be established.

SUMMARY

According to an aspect of the invention, a transmission apparatus for converting a transmission data series into frequency-domain, converting the frequency-domain converted signal into time-domain signal, and transmitting the time-domain converted signal, the apparatus including: a preamble pattern generation unit which outputs at least two preamble patterns among second and third preamble patterns, including bit series in which each of bits of a first preamble pattern is continued for n bits (where n is an integer equal to or greater than 2) and for k bits (where k is an integer equal to or greater than 2, and k≠n), and the first preamble pattern; and a transmission unit which transmits the transmission signal including at least two of the preamble patterns output from the preamble pattern generation unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7A illustrates an example the configuration of a radio frame, FIG. 7B illustrates an example of the bit series of a preamble pattern, FIG. 7C illustrates an example of the bit series of a preamble pattern, and FIG. 7D illustrates an example of the bit series of a preamble pattern;

FIG. 8A illustrates an example of the transmission spectrum of a preamble pattern, FIG. 8B illustrates an example of the transmission spectrum of a preamble pattern, and FIG. 8C illustrates an example of the transmission spectrum of a preamble pattern;

FIG. 9 is a flowchart illustrating an example of operation of a transmission apparatus;

FIG. 12 illustrates an example of the configuration of a transmission apparatus;

FIG. 15 illustrates an example of the configuration of a correlator;

FIG. 19A illustrates an example of the configuration of an OFDM transmission apparatus, and FIG. 19B illustrates an example of the configuration of an SC-OFDM transmission apparatus;

DESCRIPTION OF EMBODIMENTS

Below, embodiments of the invention are explained.

First Embodiment

Figure 1:
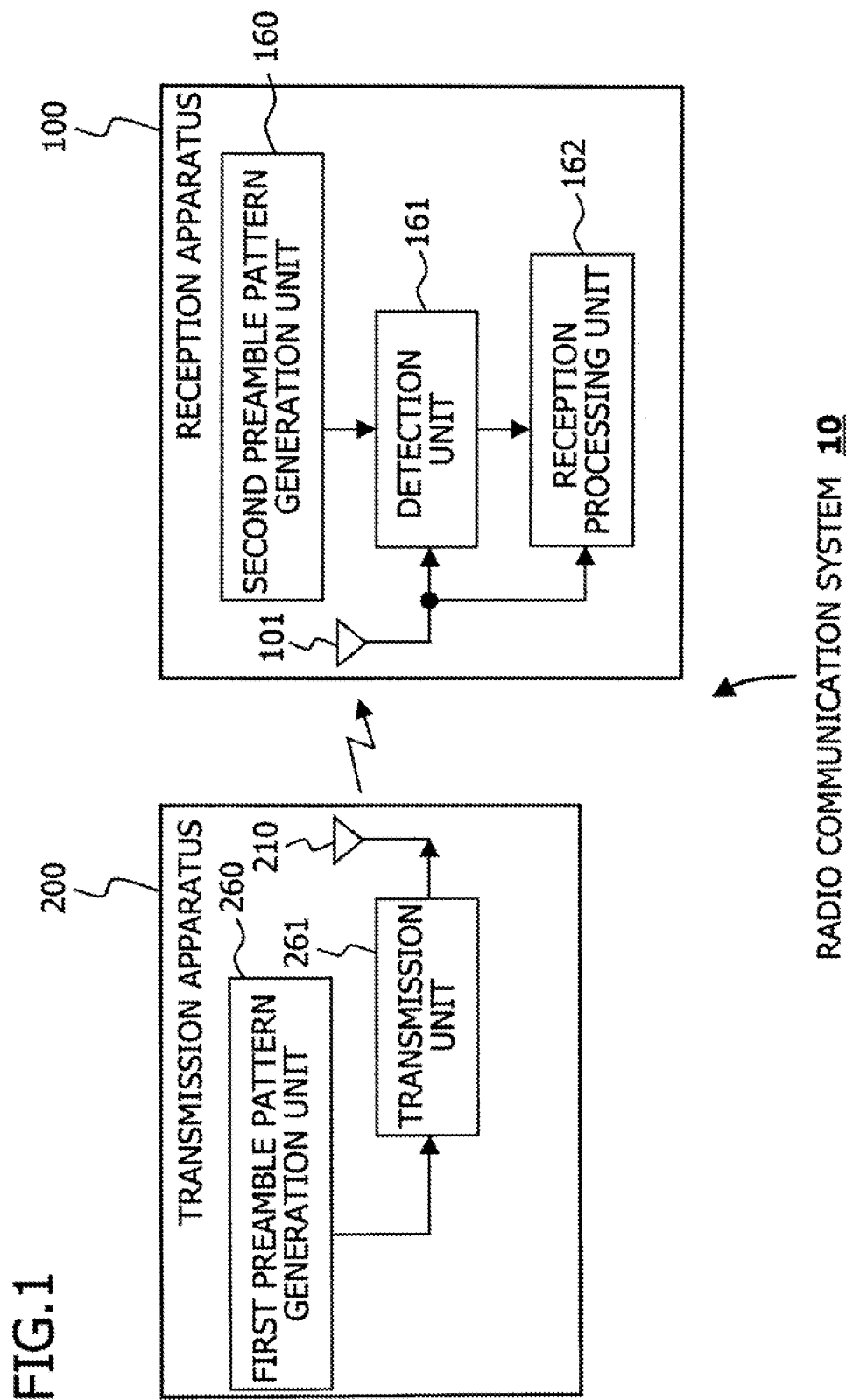
FIG. 1 illustrates an example of the configuration of a radio communication system.

A first embodiment is explained. FIG. 1 illustrates an example of the configuration of a radio communication system 10 of the first embodiment. The radio communication system 10 includes a transmission apparatus 200 and a reception apparatus 100. The transmission apparatus 200 transmits a transmission signal obtained by a transmission data series into a frequency-domain, and converting the frequency-domain converted signal into a time-domain. The reception apparatus 100 receives transmission signal transmitted from the transmission apparatus 200.

The transmission apparatus 200 comprises a first preamble pattern generation unit 260, a transmission unit 261, and an antenna 210.

The first preamble pattern generation unit 260 outputs at least two preamble patterns among second and third preamble patterns, including bit series in which each of the bits of a first preamble pattern is continued for n bits (where n is an integer equal to or greater than 2) and for k bits (where k is an integer equal to or greater than 2, and k≠n), and the first preamble pattern.

The transmission unit 261 outputs to the antenna 210 transmission signal including at least two preamble patterns output from the first preamble pattern generation unit 260.

The antenna 210 wirelessly transmits transmission signal output from the transmission unit 261 to the reception apparatus 100.

On the other hand, the reception apparatus 100 comprises an antenna 101, second preamble pattern generation unit 160, detection unit 161, and reception processing unit 162.

The antenna 101 receives transmission signal transmitted from the transmission apparatus 200. The antenna 101 outputs the transmission signal, as reception signal, to the detection unit 161 and reception processing unit 162.

The second preamble pattern generation unit 160 outputs preamble patterns output by the first preamble pattern generation unit 260 among the first to third preamble patterns. That is, the second preamble pattern generation unit 160 outputs at least two preamble patterns among the second and third preamble patterns, which include bit series which continue each of the bits of the first preamble pattern for n bits and for k bits, and the first preamble pattern.

The detection unit 161 detects synchronization timing based on at least two preamble patterns output from the second preamble pattern generation unit 160 and the reception signal.

The reception processing unit 162 performs reception processing of reception signal in synchronization with the detected synchronization timing.

In this way, the transmission apparatus 200 transmits transmission signal including at least two preamble patterns among the second and third preamble patterns, which include bit series which continue each of the bits of the first preamble pattern for n bits and for k bits, and the first preamble pattern. And, the reception apparatus 100 detects the synchronization timing by means of the transmission signal and at least two preamble patterns among the first to third preamble patterns, and performs reception processing using the detected synchronization timing.

The second and third preamble patterns include bit series which continue for a prescribed number of bits the bits of the first preamble pattern, so that preamble patterns for which the power is not unevenly distributed in a particular subcarrier are output. The reception apparatus 100 uses at least two preamble patterns among the first to third preamble patterns to detect the synchronization timing, so that the accurate synchronization timing can be detected using one among the two preamble patterns. Hence even when one preamble pattern is affected by a multipath fading environment, the accurate synchronization timing can be obtained by means of the other preamble pattern. Hence a reception apparatus 100 and transmission apparatus 200 capable of obtaining the accurate synchronization timing can be provided.

Second Embodiment

Example of Overall Configuration

Figure 2:
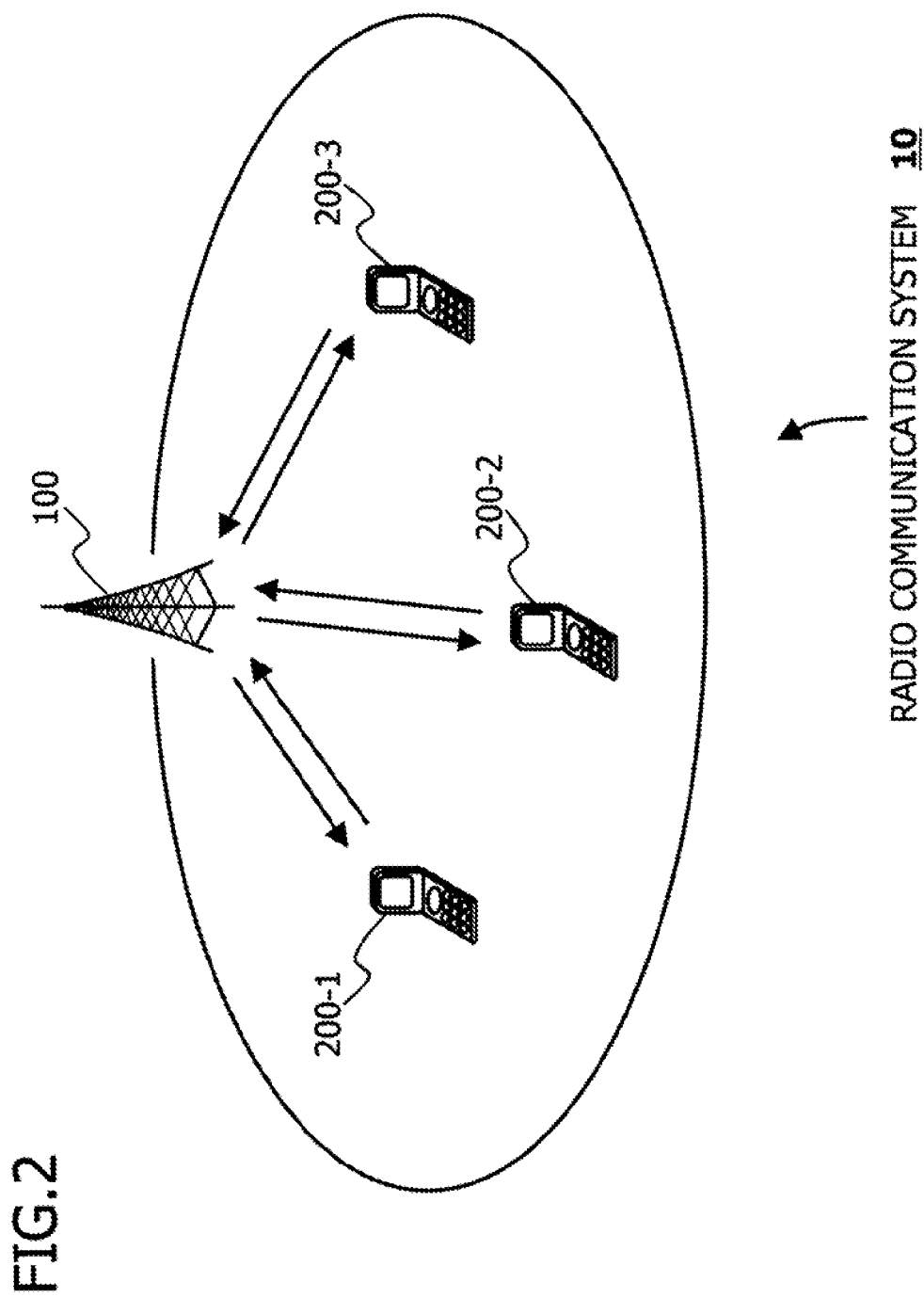
FIG. 2 illustrates an example of the configuration of a radio communication system.

Next, a second embodiment is explained. FIG. 2 illustrates an example of the configuration of the radio communication system 10 of the second embodiment. The radio communication system 10 comprises a base station apparatus (hereafter "base station") 100, and terminal apparatuses (hereafter "terminals") 200-1 to 200-3.

The base station 100 has one or a plurality of cells, and for the terminals 200-1 to 200-3 in each of the cell ranges, various services based on radio communication, such as voice conversation, video distribution, and similar, are provided. The base station 100 can perform radio communication in parallel with the plurality of terminals 200-1 to 200-3. On the other hand, the terminals 200-1 to 200-3 perform radio communication connected to the base station 100. The terminals 200-1 to 200-3 are for example portable telephone sets or portable information terminals. The terminals 200-1 to 200-3 may be single devices or a plurality of devices.

The base station 100 and terminals 200-1 to 200-3 are capable of bidirectional radio communication. That is, the base station 100 can transmit data signal, control signal and similar to the terminals 200-1 to 200-3 (downlink communication), and the terminals 200-1 to 200-3 can transmit data signal, control signal and similar to the base station 100 (uplink communication). The base station 100 performs scheduling of downlink communication and uplink communication, and allocates radio resources to perform radio communication. Scheduling information indicating the results of scheduling is transmitted as appropriate from the base station 100 to the terminals 200-1 to 200-3 as for example control signal.

In the second to fourth embodiments, explanations are given for cases of uplink communication in which for example the terminals 200-1 to 200-3 (hereafter, unless otherwise noted, referred to in explanations as "terminal 200") are transmission apparatuses and the base station 100 is a reception apparatus. In this case, a terminal 200 (or transmission apparatus 200) transmits data signal and preamble signal (or reference signal) and similar to the base station 100 (or reception apparatus 100) using the SC-OFDM method. In addition to the SC-OFDM method, the SC-OFDMA (Single Carrier-Orthogonal Frequency Division Multiple Access) method, and the SC-FDMA (Single Carrier-Frequency Division Multiple Access) method can also be applied to the transmission of such data signal and similar.

Figure 3:
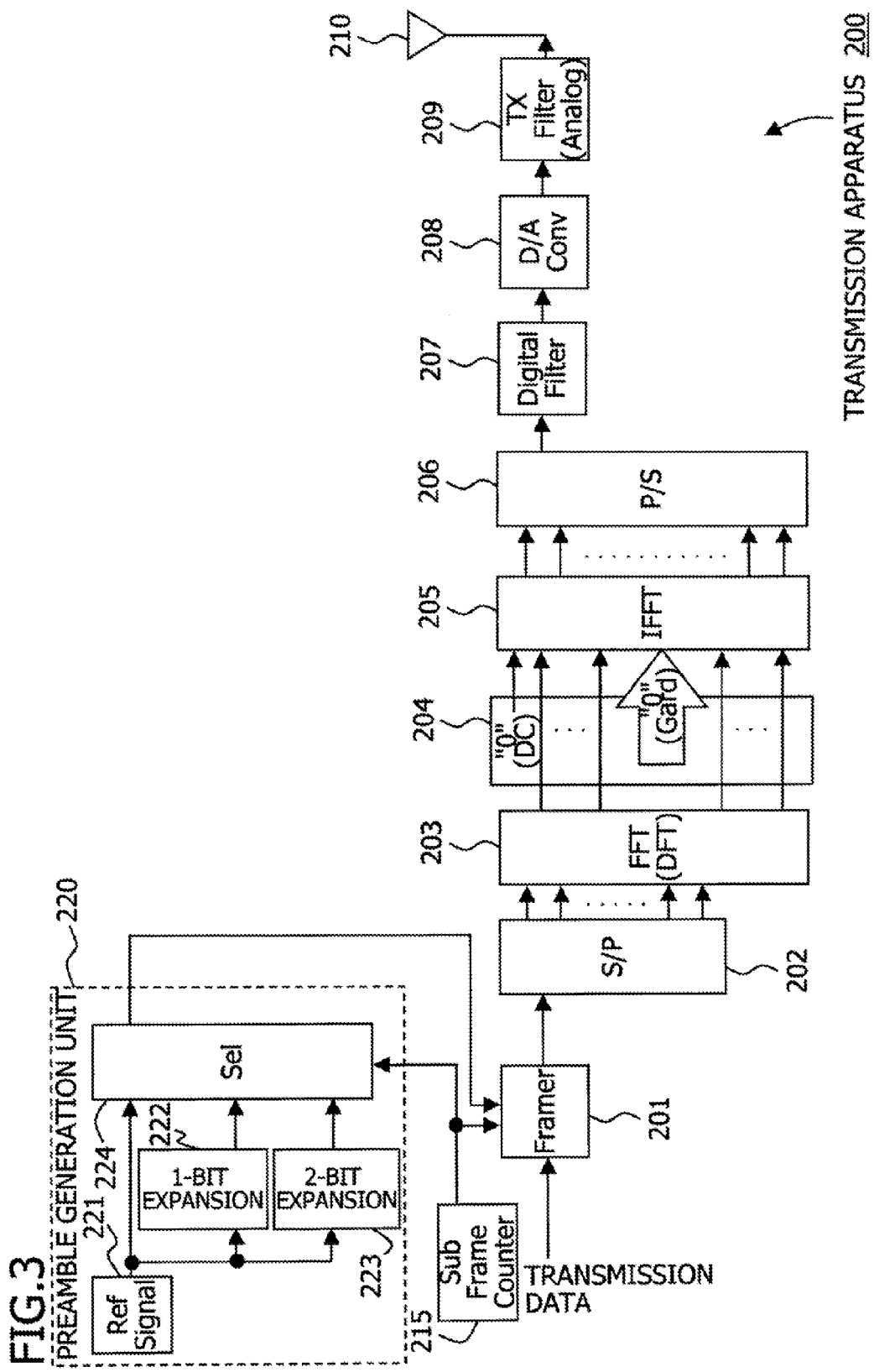
FIG. 3 illustrates an example of the configuration of a transmission apparatus.
Figure 4:
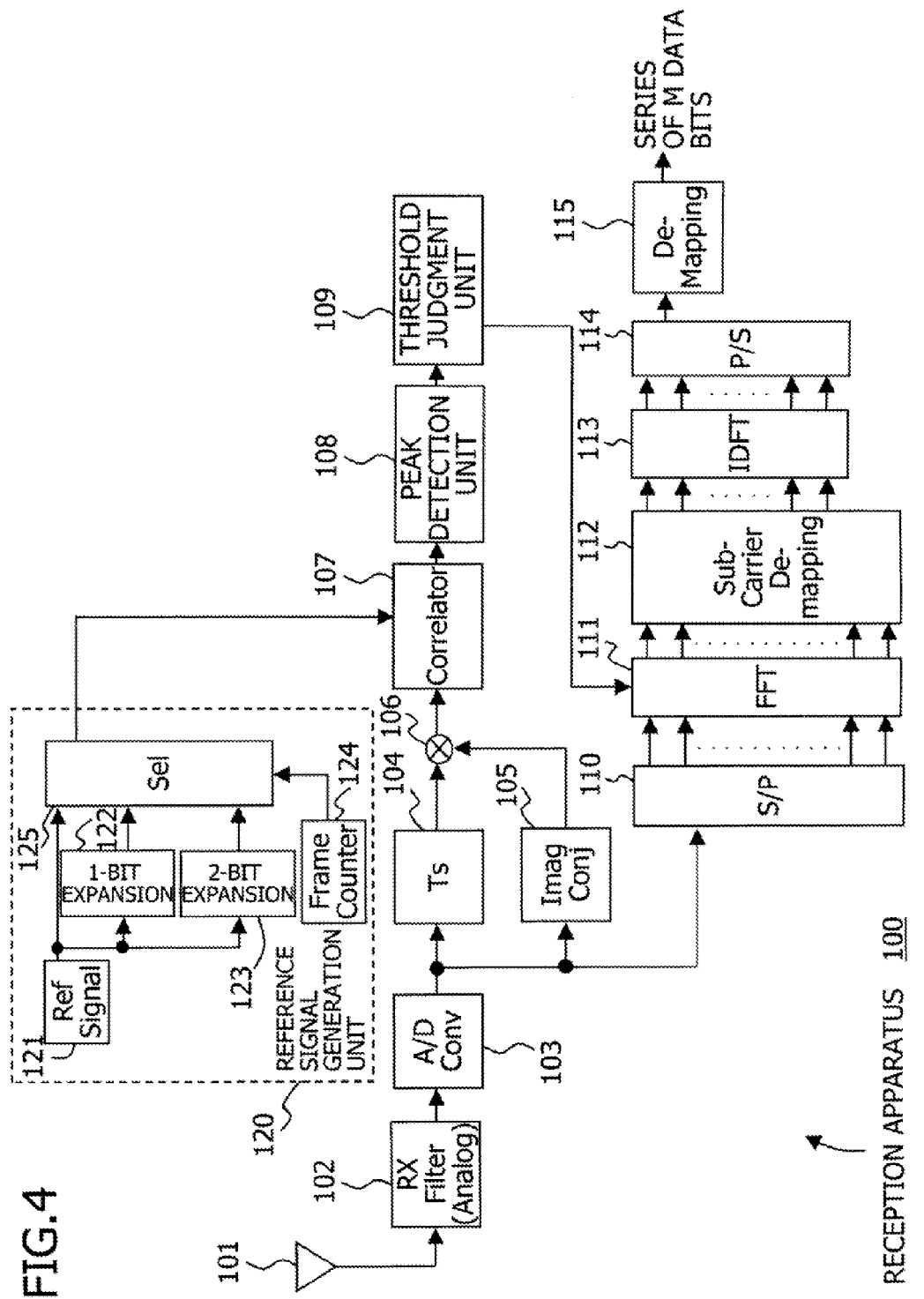
FIG. 4 illustrates an example of the configuration of a reception apparatus.

Next, examples of the configuration of the transmission apparatuses 200 and reception apparatus 100 are explained. FIG. 3 and FIG. 4 respectively illustrate examples of the configuration of the transmission apparatuses 200 and reception apparatus 100. First, an example of the configuration of the transmission apparatuses 200 is explained, and then an example of the configuration of the reception apparatus 100 is explained.

(Example of Configuration of Transmission Apparatus 200)

A transmission apparatus 200 comprises a framer 201; serial/parallel (S/P) conversion unit 202; FFT (Fast Fourier Transform, or DFT (Discrete Fourier Transform)) unit 203; subcarrier mapping unit 204; IFFT (Inverse FFT) unit 205; parallel/serial (P/S) conversion unit 206; digital filter 207; digital/analog conversion (D/A Cony) unit 208; transmission filter (TX filter) 209; antenna 210; subframe counter 215; and preamble generation unit 220.

The framer 201 performs QPSK, 16QAM or other modulation processing of time-domain transmission data signal. The framer 201 performs modulation processing according for example to scheduling information received in advance from the reception apparatus 100. The framer 201 generates subframes based on modulated transmission data signal and preamble signal output from the preamble generation unit 220, and generates a radio frame from the generated subframes. In this case, the framer 201 can generate subframes and radio frame based on a count value output from the subframe counter 215. For example, when the count value is a value indicating the first subframe, the framer 201 generates the first subframe, and similarly, subframes are generated in sequence corresponding to the count value. When the count value is the value corresponding to the number of subframes within one radio frame, the framer 201 generates the radio frame from the generated subframes, and outputs the generated radio frame.

The serial/parallel conversion unit 202 converts the transmission data signal, preamble signal and similar in the radio frame into parallel data. When the number of points of the later-stage FFT unit 203 is "M", the serial/parallel conversion unit 202 can simultaneously output M items converted into parallel format.

The FFT unit 203 performs fast Fourier transform of the parallel-converted transmission data signal, preamble signal and similar, to convert time-domain transmission data signal, preamble signal and similar into frequency-domain subcarrier signal. For example, the number of points when performing fast Fourier transform is M.

The subcarrier mapping unit 204 outputs subcarrier signal in frequency bands allocated to its own station to the IFFT unit 205, for example according to scheduling information, and allocates "0" to bands other than the frequency bands allocated to its own station. The subcarrier mapping unit 204 allocates "0" to a DC subcarrier with no transmission power. When the number of points of the later-stage IFFT unit 205 is "N" (N>M), the subcarrier mapping unit 204 can output N subcarrier signal.

The IFFT unit 205, by performing an inverse fast Fourier transform of frequency-domain subcarrier signal, performs conversion into time-domain signal.

The parallel/serial conversion unit 206 converts time-domain signal output from the IFFT unit 205 into serial format.

The digital filter 207 limits time-domain signal output from the parallel/serial conversion unit 206, for example, to a prescribed frequency band, and outputs the resulting time-domain signal.

The digital/analog conversion unit 208 converts the time-domain signal output from the digital filter 207 into analog signal.

The transmission filter 209 eliminates noise components and performs other processing of the analog signal output from the digital/analog conversion unit 208, and outputs radio frequency band transmission signal.

The antenna 210 performs radio transmission to the reception apparatus 100 of transmission signal output from the transmission filter 209. In this way, foe example, the transmission apparatus 200 transmits signal obtained by converting the transmission data (or a transmission data series) into a frequency-domain and converting the frequency-domain converted signal into a time-domain signal.

The subframe counter 215 counts for example the number of subframes, and outputs the count value to the preamble generation unit 220 and framer 201 with the timing of the beginning of a subframe. For example, the subframe counter 215 outputs the count value "1" with the timing of the beginning of the first subframe, and outputs the count value "2" with the timing of the beginning of the second subframe.

The preamble generation unit 220 generates and outputs to the framer 201 preamble signal, and comprises a reference signal output unit 221, 1-bit expansion unit 222, 2-bit expansion unit 223, and selector 224.

Figure 5A:
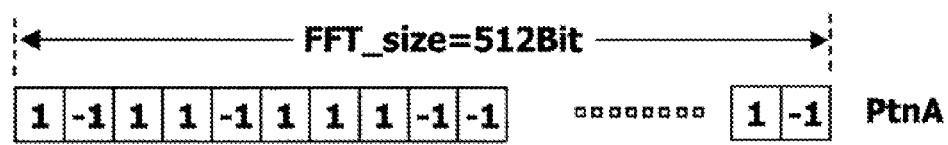
FIG. 5A illustrates an example of the bit series of a reference preamble pattern.

The reference signal output unit 221 stores a known preamble pattern, and outputs as appropriate the stored preamble pattern as preamble signal. Hence the reference signal output unit 221 comprises for example internal memory, and stores the preamble pattern in the memory. The preamble pattern stored by the reference signal output unit 221 is a preamble pattern which serves as reference in the second embodiment (hereafter "PtnA"), and is for example expressed by a unique series of 512 data bits. FIG. 5A illustrates an example of a "PtnA" data bit series which serves as reference. The reference signal output unit 221 outputs the preamble pattern "PtnA" serving as reference as reference preamble signal.

Figure 5B:
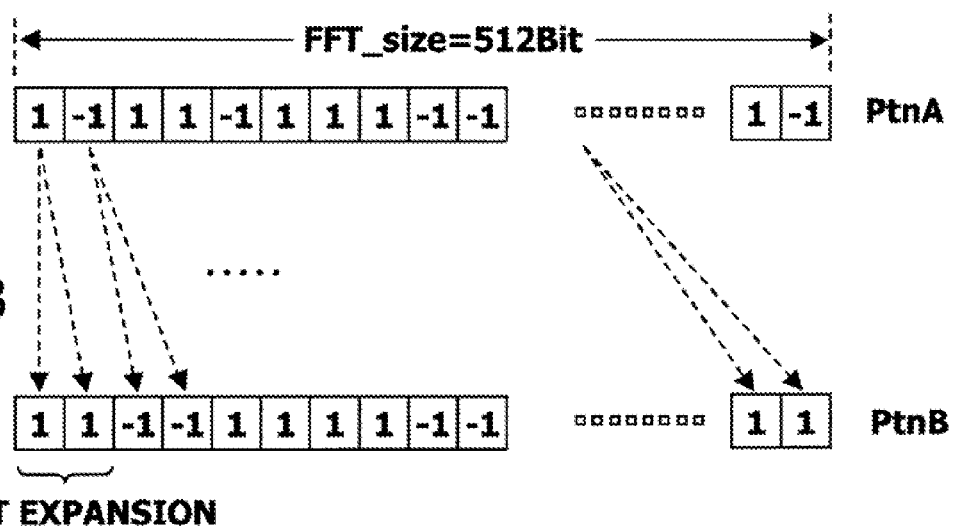
FIG. 5B illustrates an example of the bit series of a 1-bit-expanded preamble pattern.

The 1-bit expansion unit 222 generates, for reference preamble signal output from the reference signal output unit 221, a new 1-bit expanded preamble pattern, and outputs the generated preamble pattern as 1-bit expanded preamble signal. "1-bit expansion" means an operation in which, for example, the bit series of the first half of the preamble pattern "PtnA" serving as reference is extracted, and each of the bits of the extracted reference preamble pattern "PtnA" is continued for 2 bits, expanding each bit by 1 bit. For example, in this operation, a bit "1" in the preamble pattern "PtnA" serving as reference is expanded to "11", and a bit "−1" is expanded to "−1−1". FIG. 5B illustrates an example in which, for a reference preamble pattern "PtnA" which is a series of 512 bits, the series of 256 bits of the first half is extracted and used to generate a 1-bit expanded preamble pattern (hereafter "PtnB").

Figure 5C:
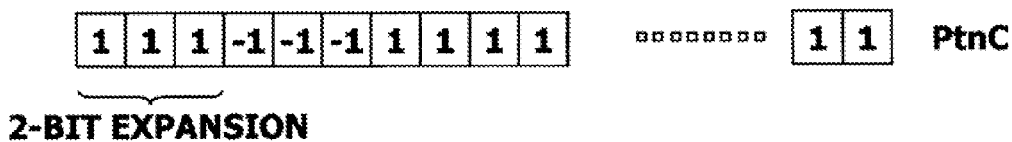
FIG. 5C illustrates an example of the bit series of a 2-bit-expanded preamble pattern.

The 2-bit expansion unit 223 generates, for reference preamble signal output from the reference signal output unit 221, a 2-bit expanded preamble pattern, and outputs the generated preamble pattern as 2-bit expanded preamble signal. "2-bit expansion" means an operation in which, for example, a series of a prescribed number of bits is extracted from the bit series of the first half of the preamble pattern "PtnA" used as reference when generating the 1-bit expanded preamble pattern "PtnB", and each of the bits is continued for 3 bits, expanding each bit by 2 bits. For example, in this operation, 171 bits are extracted among the 256 bits of the first half of the preamble pattern "PtnA" serving as reference, and a bit "1" is expanded to "111", while a bit "−1" is expanded to "−1−1−1". FIG. 5C illustrates an example of a 2-bit expanded preamble pattern (hereafter "PtnC"). In this case, a portion of the bits may protrude beyond the series of 512 bits; in this case, the protruding bits may be discarded so as to obtain a series of 512 bits.

In this way, the preamble generation unit 220 generates bit-expanded preamble patterns "PtnB" and "PtnC" for a reference preamble pattern "PtnA". The preamble generation unit 220 generates the preamble patterns "PtnA" to "PtnC" in this way so that power is not unevenly distributed in particular subcarriers for each of these generated preamble patterns "PtnA" to "PtnC". Details are explained below.

Based on the count value from the subframe counter 215, the selector 224 outputs one among the reference preamble signal, 1-bit expanded preamble signal, and 2-bit expanded preamble signal to the framer 201. For example, the selector 224 outputs the reference preamble signal when the count value indicates the first subframe, outputs the 1-bit expanded preamble signal when the second subframe is indicated, and outputs the 2-bit expanded preamble signal when the third subframe is indicated.

In the following explanation, unless otherwise stated, reference preamble signal are used to mean, with regard to the output from the selector 224, the reference preamble pattern "PtnA", 1-bit expanded preamble signal are used to mean the 1-bit expanded preamble pattern "PtnB", and so on.

By this means, in the framer 201 the radio frame is formed with for example the reference preamble pattern "PtnA" allocated to the first subframe, and the 1-bit expanded preamble pattern "PtnB" allocated to the second subframe. Further, the radio frame is formed with the 2-bit expanded preamble pattern "PtnC" allocated to the third subframe.

After all of the subframes included in one radio frame have been counted, the subframe counter 215 resets and again counts from the beginning. When the number of subframes in one radio frame is "3", after the subframe counter 215 counts the third subframe, the first subframe is again output as a count value. Hence the selector 224, after selecting and outputting the 2-bit expanded preamble pattern "PtnC", again outputs, for example, the reference preamble pattern "PtnA" when the count value is "1".

(Examples of the Configurations of Subframe and Radio Frame)

Figure 6:
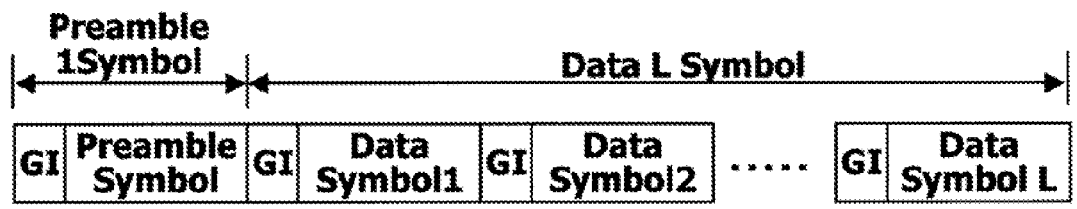
FIG. 6 illustrates an example of the configuration of a subframe.

Next, examples of the configurations of subframe and radio frame formed by the framer 201 in this way and transmitted to the reception apparatus 100 are explained. FIG. 6 illustrates an example of the configuration of a subframe. One subframe includes one preamble symbol and a plurality of (for example, L) data symbols. For example, any one among the preamble patterns "PtnA" to "PtnC" is allocated to the preamble symbol. Data signal is allocated to each of the data symbols.

In order to prevent intersymbol interference, a guard interval (GI) is inserted between each pair of symbols. For example, by replicating a plurality of samples at the termination of each symbol, and inserting at the beginning of each symbol, guard intervals are formed.

FIG. 7A illustrates an example of the configuration of the radio frame. In this example, one radio frame includes three subframes. The reference preamble pattern "PtnA" is allocated to the first subframe, the 1-bit expanded preamble pattern "PtnB" is allocated to the second subframe, and the 2-bit expanded preamble pattern "PtnC" is allocated to the third subframe.

Such preamble patterns "PtnA" to "PtnC" have different power spectra, and are such that power is not unevenly distributed at a particular frequency. The reason for this is explained below.

FIG. 7B to FIG. 7D each illustrate an example of a preamble pattern waveform. If the frequency of the reference preamble pattern "PtnA" is "Fa" Hz, then the frequency of the 1-bit expanded preamble pattern "PtnB" in the example of FIG. 7C is "Fa/2" Hz. This is because each of the bit series of the 1-bit expanded preamble pattern "PtnB" is a continuous bit series which continues for two bits with regard to each of the bits in the reference preamble pattern "PtnA", so that bits are prolonged to two bits. For example, when a bit series in the reference preamble pattern "PtnA" is "1 −1", in the 1-bit expanded preamble pattern "PtnB" this becomes "1 1 −1 −1", prolonged by two bits, so that the frequency is halved.

Further, the 2-bit expanded preamble pattern "PtnC" is a continuous bit series which continues for three bits and in which each of the bits in the reference preamble pattern "PtnA" is prolonged for three bits. Hence for a frequency "Fa" of the reference preamble pattern "PtnA", the frequency of the 2-bit expanded preamble pattern "PtnC" in the example of FIG. 7D is "Fa/3" Hz.

In the example of FIG. 7B, the reference preamble pattern "PtnA" is a series of different bits in the sequence "1", "−1", "1", "−1", and consequently the frequency thereof can be for example "Fa" Hz. However, even when the reference preamble pattern includes series of continuous bits such as "1", "1", if there is a pattern "1", "−1", then the maximum frequency is for example "Fa" Hz. Even in the case of such a reference preamble pattern "PtnA", the maximum frequency of the 1-bit expanded preamble pattern "PtnB" is "Fa/2" Hz, and the maximum frequency of the 2-bit expanded preamble pattern "PtnC" is "Fa/3" Hz.

Hence frequency components included in the bit-expanded preamble patterns "PtnB" and "PtnC" are different from the frequency components included in the reference preamble pattern "PtnA". Consequently the power of the preamble patterns "PtnA" to "PtnC" is not unevenly distributed at particular frequencies or subcarriers.

FIG. 8A to FIG. 8C respectively illustrate examples of transmission frequency spectra for the preamble patterns "PtnA" to "PtnC". In FIG. 8A to FIG. 8C, the horizontal axis indicates frequency, and the vertical axis indicates transmission power. As illustrated in these figures, the frequencies at which power peaks are different for each of the preamble patterns "PtnA" to "PtnC". This is because, as explained above, by "prolonging" a bit series by means of bit expansion, the frequency components of the preamble patterns "PtnA" to "PtnC" are each different.

In the second embodiment, by switching between such preamble patterns "PtnA" to "PtnC" at each subframe and performing transmission, the reception characteristics of the preamble at the reception apparatus 100 are improved, and accurate synchronization timing can be obtained. The reason for this is explained below.

Further, in the transmission apparatus 200, the bit-expanded preamble patterns "PtnB" and "PtnC" can be generated merely by storing the reference preamble pattern "PtnA". Hence the quantity of information stored in the transmission apparatus 200 can be reduced compared with a case in which all preamble patterns are stored. In the reception apparatus 100 described below as well, the reference preamble pattern "PtnA" is stored, and compared with a case in which all preamble patterns are stored, the quantity of information stored can be reduced.

(Example of Configuration of Reception Apparatus 100)

Next, an example of the configuration of the reception apparatus 100 is explained. The reception apparatus 100 receives transmission signal transmitted from the transmission apparatus 200. As illustrated in FIG. 4, the reception apparatus 100 comprises an antenna 101; reception filter (Rx filter) 102; analog/digital conversion (A/D Cony) unit 103; delay (Ts) 104; complex conjugate computation (Image Conj) unit 105; multiplier 106; correlator (or correlation unit) 107; peak detection unit 108; threshold judgment unit 109; serial/parallel conversion unit 110; FFT unit 111; subcarrier mapping unit 112; IDFT unit 113; parallel/serial conversion unit 114; and demapping unit 115.

The antenna 101 receives transmission signal transmitted from the transmission apparatus 200, and outputs the signal as reception signal. Reception signal include the preamble signal of preamble patterns "PtnA" to "PtnC", different for each subframe. The reception signal is for example signal transmitted after converting to the time domain signal obtained by converting transmission signal (or the transmission data series) to the frequency domain.

The reception filter 102 eliminates out-of-band noise from reception signal received by the antenna 101 and performs other band-limiting processing, and outputs the result as reception signal.

The analog/digital conversion unit 103 converts reception signal output from the reception filter 102 into digital signal.

The delay 104 delays the reception signal converted into digital signal by for example one sample's worth, and outputs the result. The complex conjugate computation unit 105 computes the complex conjugate of the reception signal converted into digital signal. The multiplier 106 multiplies the (k−1)th sample reception signal delayed by one sample and the kth sample reception signal the complex conjugate of which was taken, and outputs the result. The circuit including the delay 104, complex conjugate computation unit 105, and multiplier 106 is for example a delay detection circuit, and can eliminate or alleviate phase differences between samples in reception signal. By including such a delay detection circuit in the reception apparatus 100, for example a circuit to generate local signal and similar become unnecessary, and the circuit configuration is simplified.

Figure 21:
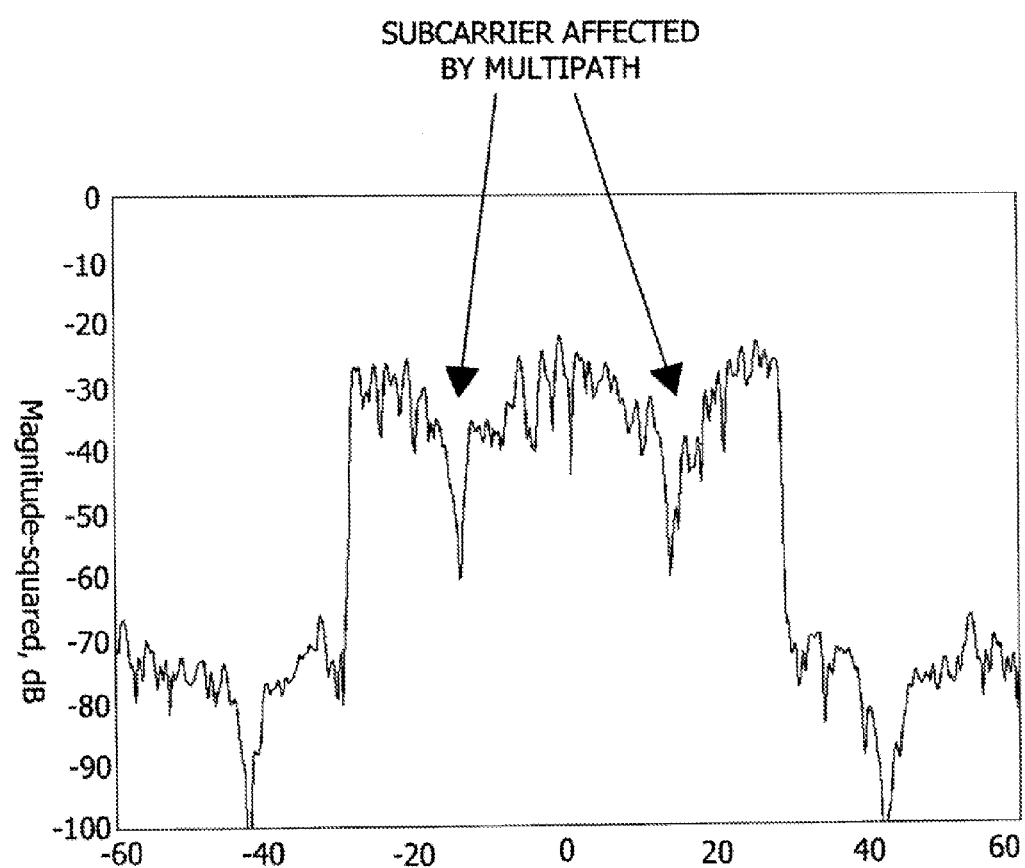
FIG. 21 illustrates an example of a reception spectrum.

The correlator 107 takes as inputs the reception signal output from the multiplier 106 (or the delay detection circuit) and the preamble patterns output from a reference signal generation unit 120, and outputs the correlation power value for the reception signal. The correlator 107 outputs the correlation power value for each sample, for example, as illustrated in FIG. 21A and FIG. 21B.

The peak detection unit 108 detects the correlation peak power value for the correlation power value output from the correlator 107 and the timing of the correlation peak power value, and outputs the detected correlation peak power value and timing. The peak detection unit 108 outputs as the correlation peak power, for example, the maximum value of the correlation power value in a prescribed interval.

The threshold judgment unit 109 judges whether the correlation peak power value obtained by the peak detection unit 108 is greater than a threshold value, and if greater than the threshold value, outputs the timing of the correlation peak power value to the FFT unit 111. This is because when reception signal are affected by multipath fading, compared with a case in which there is no influence, often the correlation peak power value is markedly lower. Hence the threshold judgment unit 109 judges whether, when the correlation peak power value exceeds the threshold, the accurate symbol synchronization timing has been obtained. When the correlation peak power value obtained by the peak detection unit 108 is equal to or below the threshold, the threshold judgment unit 109 does not output the timing of the correlation peak power value, but instead, for example, discards the timing.

The serial/parallel conversion unit 110 converts the reception signal, converted into digital signal, into a parallel format, and outputs the result. For example, the serial/parallel conversion unit 110 can output N reception signal in parallel.

The FFT unit 111 performs fast Fourier transform processing of the parallel-format reception signal, converting time-domain reception signal into frequency-domain reception signal. When performing fast Fourier transform processing, the FFT unit 111 can synchronize with the timing output from the threshold judgment unit 109 (for example, the symbol synchronization timing), that is, can synchronize with the preamble signal included in the reception signal, to perform fast Fourier transform processing.

The subcarrier demapping unit 112 extracts the subcarriers transmitted from the transmission apparatus 200 from the frequency-domain reception signal. For example, the subcarrier demapping unit 112 extracts subcarriers scheduled for the transmission apparatus 200 according to scheduling information from among subcarriers arranged at prescribed intervals on the frequency axis. For example, the subcarrier demapping unit 112 extracts M subcarriers. The subcarrier demapping unit 112 outputs the extracted subcarriers to the IDFT unit 113.

The IDFT unit 113 performs inverse discrete Fourier transform processing of the extracted subcarriers, to convert frequency-domain reception signal into time-domain reception signal.

The parallel/serial conversion unit 114 converts the parallel-format output signal of the IDFT unit 113 into serial-format signal.

The demapping unit 115 performs demodulation processing of reception signal output from the parallel/serial conversion unit 114, corresponding to the modulation method (QPSK, 16QAM, or similar) performed in the transmission apparatus 200. Demodulation processing is performed according, for example, to scheduling information. The demapping unit 115 can extract data bit series mapped to in-phase components (I signal) and quadrature components (Q signal) of the reception signal, and the extracted data bit series (for example M items) are output to a later-stage processing unit.

The reference signal generation unit 120 comprises a reference signal output unit 121, 1-bit expansion unit 122, 2-bit expansion unit 123, frame counter 124, and selector 125.

The reference signal output unit 121 olds the same reference preamble pattern "PtnA" as the reference preamble pattern "PtnA" held by the reference signal output unit 221 of the transmission apparatus 200, and outputs this pattern as appropriate. The reference signal output unit 121 comprises for example internal memory, and can store the reference pattern "PtnA" in this memory.

The 1-bit expansion unit 122, similarly to the 1-bit expansion unit 222 of the transmission apparatus 200, extracts the bit series of the first half among the bit series of the reference preamble pattern "PtnA" output from the reference signal output unit 121, and performs an operation to continue each bit. The 1-bit expansion unit 122 generates and outputs a preamble pattern "PtnB" obtained by 1-bit expansion of the reference preamble pattern "PtnA".

The 2-bit expansion unit 123, similarly to the 2-bit expansion unit 223 of the transmission apparatus 200, extracts a series of a prescribed number of bits among the bit series used in 1-bit expansion, among the bit series of the reference preamble pattern "PtnA" output from the reference signal output unit 121. By performing an operation to continue for three bits each of the extracted bits, the 2-bit expansion unit 123 generates and outputs a 2-bit expanded preamble pattern "PtnC".

The frame counter 124 counts the number of radio frame, and outputs the count value with for example the timing of the beginning of the radio frame. The frame counter 124 outputs the counted count value to the selector 125.

The selector 125 outputs one among the reference preamble pattern "PtnA", 1-bit expanded preamble pattern "PtnB", and 2-bit expanded preamble pattern "PtnC" at each radio frame interval, for example with the input timing of the count value from the frame counter 124, and according to the count value. By this means, the selector 125 outputs, for example, the reference preamble pattern "PtnA" in the initial radio frame interval, and the 1-bit expanded preamble pattern "PtnB" in the next radio frame interval. Further, the selector 125 outputs, for example, the 2-bit expanded preamble pattern "PtnC" in the third radio frame interval. The selector 125 outputs the same preamble pattern in one radio frame interval, and outputs a different preamble pattern in the next radio frame interval. When this conforms for example to the order of the preamble patterns "PtnA" to "PtnC" and transmission is executed according to this order of the preamble patterns "PtnA" to "PtnC" from the transmission apparatus 200, the reception apparatus 100 awaits preamble patterns in this order.

(Preamble Signal Reception Characteristics)

Next, the reason for the improvement in reception characteristics of preamble signal by the reception apparatus 100 by obtaining correlation output based on each of the preamble patterns output from the reference signal generation unit 120 is explained.

First, an example is explained in which the reception apparatus 100 has received the radio frame illustrated in FIG. 7A. That is, this transmission frame includes the reference preamble pattern "PtnA" in the first subframe, the 1-bit expanded preamble pattern "PtnB" in the second subframe, and the 2-bit expanded preamble pattern "PtnC" in the third subframe. The reference signal generation unit 120 outputs to the correlator 107 the reference preamble pattern "PtnA" in the first radio frame interval. In this case, the correlator 107 obtains the correlation peak power value in the preamble section of the first subframe in one radio frame interval.

However, consider a case in which the reference preamble pattern "PtnA" is affected by multipath fading. In such a case, the power at the particular frequency at which peak power should have occurred in the reference preamble pattern "PtnA" is lower than that at another frequency (see for example FIG. 21), and is lower than in a case in which the correlation power for the reference preamble pattern "PtnA" is not affected. The output of the correlator 107 in this case is as illustrated for example in FIG. 21B. Hence in the first radio frame interval, the threshold judgment unit 109 judges that the correlation peak power value is equal to or below the threshold value, and cannot output the synchronization timing.

In the next radio frame interval, the reference signal generation unit 120 outputs the 1-bit expanded preamble pattern "PtnB" to the correlator 107. The frequency affected by multipath fading is for example the frequency of the peak power in the reference preamble pattern "PtnA". In this case, compared with the reference preamble pattern "PtnA", the frequency components are different, and the possibility that the preamble pattern "PtnB" with a different peak power frequency will be affected by multipath fading is lower than for the reference preamble pattern "PtnA". Hence in the correlator 107, the correlation peak power value is obtained in the second subframe preamble section, and for example the output illustrated in FIG. 21A is obtained. The threshold judgment unit 109 judges that the correlation peak power value exceeds the threshold value, and can output, as the synchronization timing, the timing at which the correlation peak power value was obtained.

There are also cases in which the 1-bit expanded preamble pattern "PtnB" is affected by multipath fading. In such cases, the correlation peak power value output from the correlator 107 is low compared with when there is no influence (see for example FIG. 21B).

In such cases, a judging as to whether the synchronization timing is obtained is made in the next radio frame interval. That is, the reference signal generation unit 120 outputs the 2-bit expanded preamble pattern "PtnC" to the correlator 107. The frequency components of the 2-bit expanded preamble pattern "PtnC" are different from the frequencies of the peak power of the two preamble patterns "PtnA" and "PtnB". Hence even if the two preamble patterns "PtnA" and "PtnB" are affected by multipath fading, the possibility that the 2-bit expanded preamble pattern "PtnC" is affected by multipath fading is low. Thus the correlation peak power value output from the correlator 107 is judged by the threshold judgment unit 109 to exceed the threshold value, and the timing with which the correlation peak power value was obtained can be output as the synchronization timing.

From the above, even when the radio communication system 10 is in an environment with multipath fading which affects a particular frequency or subcarrier, accurate reception synchronization timing can be obtained by means of one among, for example, three preamble patterns with different frequency components.

Operation Example

Next, an operation example is explained. Because a portion of an operation example has already been explained, a brief explanation is given. First, an operation example for the transmission apparatus 200 is explained.

FIG. 9 is a flowchart illustrating an example of operation in the transmission apparatus 200. The operation example is explained following FIG. 9. The transmission apparatus 200 begins processing (S10), and based on the stored reference preamble pattern "PtnA", generates the 1-bit expanded and 2-bit expanded preamble patterns "PtnB" and "PtnC" (S11). For example, when the count value from the subframe counter 215 is "1", the preamble generation unit 220 outputs the reference preamble pattern "PtnA", and when the count value is "2" outputs the 1-bit expanded preamble pattern "PtnB". And, when the count value is "3", the preamble generation unit 220 outputs the 2-bit expanded preamble pattern "PtnC". The count value is then reset to "1", and the preamble generation unit 220 again outputs the reference preamble pattern "PtnA".

Next, the transmission apparatus 200 forms subframes from the preamble patterns "PtnA" to "PtnC" and transmission data modulated by QPSK or similar, and then forms the radio frame (S12). For example, when the count value from the subframe counter 215 is "1", the framer 201 allocates the reference preamble pattern "PtnA" to the beginning symbol of the first subframe. When the count value is "2", the framer 201 allocates the 1-bit expanded preamble pattern "PtnB" to the beginning symbol of the second subframe. And when the count value is "3", the framer 201 allocates the 2-bit expanded preamble pattern "PtnC" to the beginning symbol of the third subframe. Then, the framer 201 forms the radio frame such that for example three subframes become one radio frame.

Next, the transmission apparatus 200 converts each of the symbols within the radio frame into frequency-domain symbols, and performs subcarrier mapping (S13). For example, because the preamble signal, data signal and similar are allocated to the subcarriers allocated to the transmission apparatus 200, the subcarrier mapping unit 204 outputs these signal without modification, but maps "0" to subcarriers not allocated to the transmission apparatus 200. For example, allocation to subcarriers and similar is performed based on scheduling information received in advance from the reception apparatus 100.

Next, after subcarrier mapping, the transmission apparatus 200 performs conversion into time-domain signal, and performs digital filtering and other transmission processing (S14). Transmission processing includes, for example, processing by the digital filter 207, transmission filter 209 and similar; by this means, preamble signal, data signal and similar within the radio frame are transmitted to the reception apparatus 100 as transmission signal.

Next, an example of operation of the reception apparatus 100 is explained. The reception apparatus 100 begins processing (S20), and filtering, delay detection, and other reception processing of reception signal is performed (S21). For example, the reception filter 102 performs out-of-band noise removal of reception signal and similar, and the analog/digital conversion unit 103 converts the filtered reception signal into digital signal. Here, the kth sample from the frame beginning of digitally converted reception signal $P_k$ is for example expressed by the following equation.

[Expression 1]

$$P_k = \left\{\sum_{i=1}^{I} p_i e^{j\theta i} b_{k-\tau ii}\right\} e^{j(2\pi\Delta f \cdot kTs + \vartheta_0)} \quad (1)$$

In equation (1), I is the total number of delayed waves, $P_i$, $e^{j\theta i}$, and $\tau_i$ respectively represent the amplitude, phase, and delay time of the ith delayed wave, $\Delta f$ is the frequency offset, Ts is the sampling time interval, and $\theta_0$ is the initial phase. Further, $b_k$ represents the time-axis signal obtained by first converting information signal $a_n$ on the transmission side into frequency-domain signal by FFT, and then further performing IFFT conversion, and are for example expressed by the following equation.

[Expression 2]

$$b_k = \sum_{n=0}^{N-1} c_n \cdot e^{j\frac{2\pi nk}{N}} \quad (2)$$

Here,

[Expression 3]

$$c_k = \sum_{m=0}^{M-1} a_n \cdot e^{-j\frac{2\pi mk}{N}} \quad (3)$$

Here N is the number of IFFT points and M is the number of FFT points. The result of adding GIs (Guard Intervals) to the signal of equation (2) is transmitted from the transmission apparatus 200 as transmission signal.

Delay detection processing is for example performed by the delay 104, complex conjugate computation unit 105, and multiplier 106. For example, the delay 104 delays reception signal $P_k$ by one sample, the complex conjugate computation unit 105 computes the complex conjugate of the kth sample of reception signal $P_k$, and the multiplier 106 multiples the two outputs. The output signal of the multiplier 106 for the dth sample from the frame beginning (or the output signal of the delay detection circuit) T(d) is expressed by the following equation.

[Expression 4]

$$T(d) = P_{k+d-1} \cdot P^*_{k+d} \quad (4)$$

Next, the reception apparatus 100 generates the reference preamble pattern "PtnA", 1-bit expanded pattern "PtnB", and 2-bit expanded pattern "PtnC", and outputs one of these preamble patterns to the correlator 107 at each frame (S22). For example, in the reference signal generation unit 120, each of the preamble patterns is generated, and with the timing of the input to the selector 125 of the count value output from the frame counter 124, the selector 125 outputs the preamble pattern corresponding to the count value. For example, when, as the preamble signal transmitted from the transmission apparatus 200, three preamble patterns "PtnA" to "PtnC" are used in this order, the reference signal generation unit 120 outputs these three preamble patterns "PtnA" to "PtnC" in this order.

Next, the reception apparatus 100 calculates the correlation power between the reception signal and the preamble pattern, and detects the correlation peak power value (S23). The correlation power is determined by for example computing the cross-correlation value between the output signal of the multiplier 106 (or the output signal of a delay detection circuit) T(d) and a reference signal R(k). The reference signal R(k) is for example a preamble signal which is one of the preamble patterns "PtnA" to "PtnC" after being passed in advance through a delay detection circuit. When the preamble pattern "PtnA" to "PtnC" is the reference preamble pattern "PtnA", the reference signal R(k) is for example expressed by the following equation.

[Expression 5]

$$R(k) = b^*_{k-1} \cdot b_k \quad (5)$$

Here, if there is a delay of d samples between the output signal T(d) of the multiplier 106 and the reference signal R(k), then the cross-correlation value over one symbol preamble is for example given by the following equation.

[Expression 6]

$$Zp(d) = \sum_{k=1}^{N'-1} T(d) \cdot R(k) = \sum_{k=1}^{N'-1} (P_{k+d-1} \cdot P^*_{k+d})(b^*_{k-1} \cdot b_k) \quad (6)$$

Figure 20A:
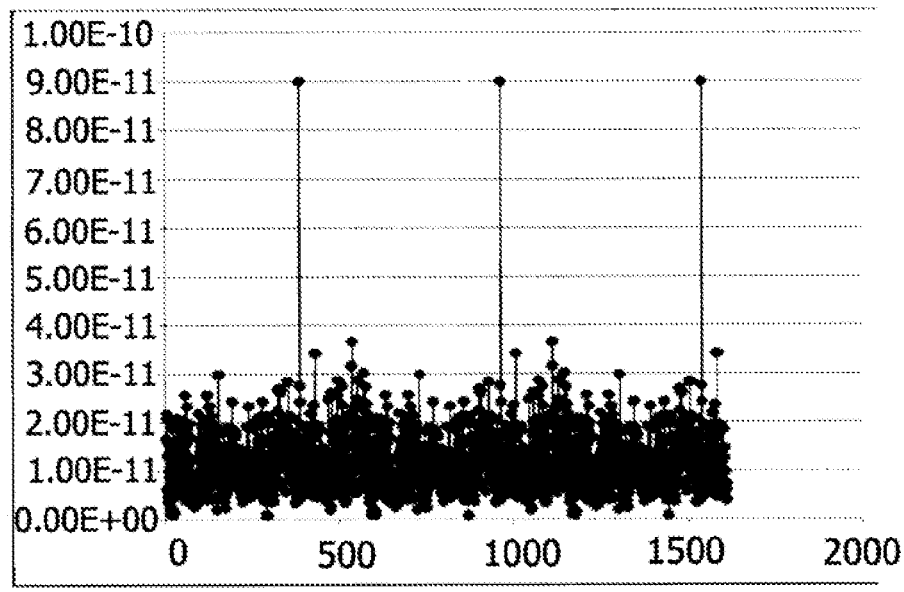
FIG. 20A illustrates an example of correlation power in a preamble section.
Figure 20B:
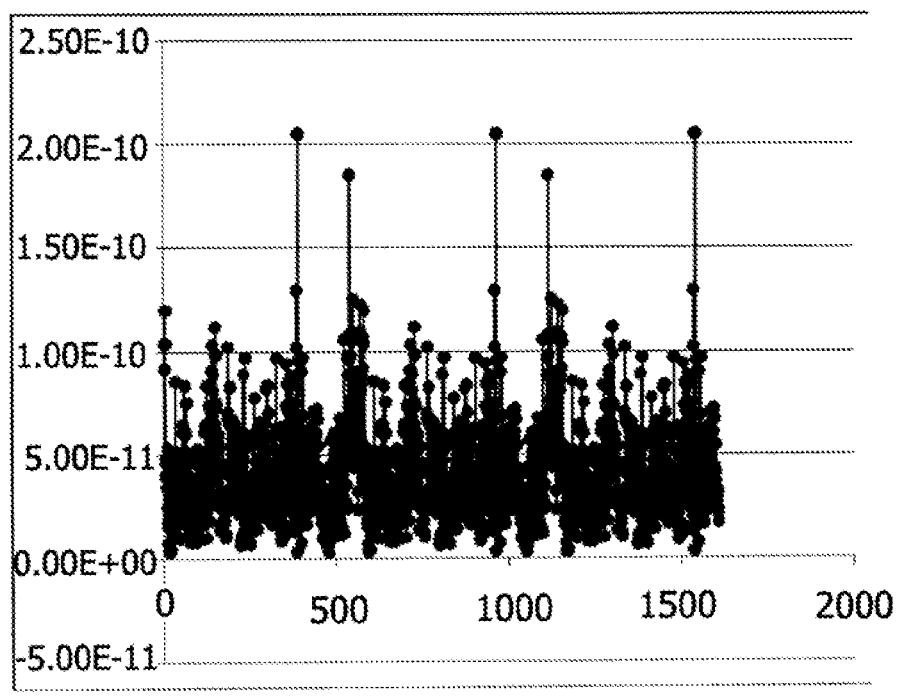
FIG. 20B illustrates an example of correlation power in a preamble section.

In equation (6), N' is the number of samples included in the symbol time including GIs. The cross-correlation value given by equation (6) expresses for example the output from the correlator 107 (for example FIG. 20A or FIG. 20B).

The correlator 107 obtains a sharp peak at sample timing at which the preamble pattern "PtnA" to "PtnC" generated by the reference signal generation unit 120 (or which is being awaited) and the reception signal pattern coincide. And, the peak detection unit 108 performs a peak search over one symbol section of the reception signal including GIs, and detects the highest correlation power value and the timing thereof.

Next, the reception apparatus 100 judges whether the detected correlation peak power value exceeds a threshold value (S24). For example, when the reception signal is being affected by multipath fading, compared with a case of no influence, the correlation peak power may be significantly lowered. Hence the threshold judgment unit 109 compares the correlation peak power value with a threshold value, and when the threshold value is exceeded, judges that the accurate symbol synchronization timing was obtained (Yes in S24).

On the other hand, when the correlation peak power value is equal to or less than the threshold value (No in S24), the threshold judgment unit 109 judges that the accurate symbol synchronization timing was not obtained, and the processing of S21 and beyond is performed on the reception signal received in the next radio frame interval.

When the correlation peak power value exceeds the threshold (Yes in S24), the reception apparatus 100 outputs the symbol synchronization timing with which the correlation peak power was obtained to the FFT unit 111, and FFT processing of the reception signal is performed (S25). For example, the FFT unit 111 performs FFT processing with the symbol synchronization timing from the threshold, judgment unit 109 as the start timing.

Next, the reception apparatus 100 performs demapping and other processing, and extracts the data bit series transmitted from the transmission apparatus 200 (S26).

In this second embodiment, as examples of preamble patterns, a reference preamble pattern "PtnA", a 1-bit expanded preamble pattern "PtnB", and a 2-bit expanded preamble pattern "PtnC" were explained. For example, a 3-bit expanded preamble pattern "PtnD" may also be used. Such a pattern is for example generated by an operation of continuing for four bits each of the bits in a series of a prescribed number of bits among the reference preamble pattern "PtnA" which was the basis for the 1-bit expanded preamble pattern "PtnB".

In this case, when four subframes are included in one radio frame, the transmission apparatus 200 inserts the preamble patterns "PtnA" to "PtnD" in order into the beginning symbol at each subframe, and performs transmission. Hence the preamble generation unit 220 may further comprise a 3-bit expansion unit. The reception apparatus 100 awaits reception signal with the preamble patterns "PtnA" to "PtnD" in each radio frame. In this case, the reception apparatus 100 also generates a 3-bit expanded preamble pattern by means of a 3-bit expansion unit, and by obtaining the correlation peak power value with the reception signal, can obtain the synchronization timing.

Further expansion may be performed, using preamble patterns obtained by 4-bit, 5-bit, and further expansion to extract the synchronization timing. In this case, both the transmission apparatus 200 and the reception apparatus 100 comprise generation units which generate 4-bit, 5-bit, or other expanded preamble patterns, and in the reception apparatus 100, by obtaining the correlation output using different preamble patterns for each radio frame, the synchronization timing can be extracted. For example, the transmission apparatus 200 can transmit at least two preamble patterns among the reference preamble pattern "PtnA" and a plurality of expanded preamble patterns. In this case, the reception apparatus 100 awaits the two preamble patterns used in transmission, and can extract the synchronization timing by taking the correlation power for each radio frame. In such a case, the transmission apparatus 200 generates or outputs the two preamble patterns used in transmission by means of the preamble pattern generation unit 220. Further, the reference signal generation unit 120 of the reception apparatus 100 generates the two preamble patterns used in transmission and outputs the two preamble patterns in alternation to the correlator 107 in each radio frame interval, to extract the synchronization timing similarly to the above-described example.

Further, in the second embodiment, the explanation assumed that three subframes are included within one radio frame; however, for example ten subframes may be included in one radio frame. In this case, the transmission apparatus 200 may allocate the preamble patterns "PtnA" to "PtnC" repeatedly in order for each subframe to generate and transmit radio frames. Similarly to the example explained above, the reception apparatus 100 awaits the reference preamble pattern "PtnA" and similar in the first radio frame, and different preamble patterns "PtnA" to "PtnC" in each radio frame, and obtains the correlation power value.

However, in all cases the reception apparatus 100 awaits the preamble patterns "PtnA" to "PtnD" according to the transmission order of the preamble patterns "PtnA" to "PtnD" transmitted from the transmission apparatus 200.

Third Embodiment

Next, a third embodiment is explained. In the second embodiment, the preambles within one subframe were explained for the example of one symbol. In the third embodiment, an example is explained in which the preambles within one subframe are in two symbols.

Figures 11A, 11B:
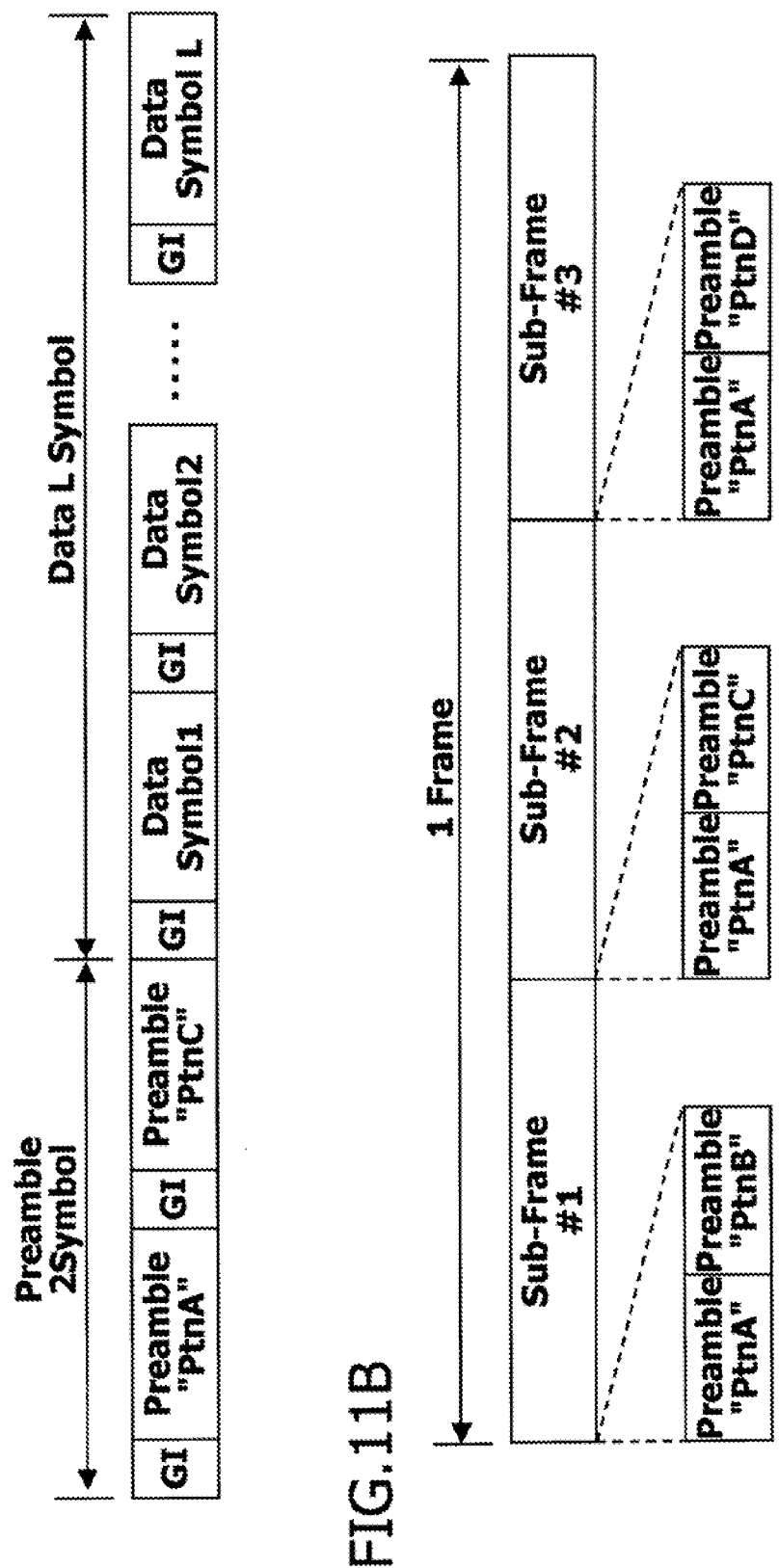
FIG. 11A illustrates an example of the configuration of a subframe.
FIG. 11B illustrates an example of the configuration of a radio frame.

FIG. 11A and FIG. 11B illustrate examples of the configuration of a subframe and one radio frame respectively in the third embodiment. The preamble pattern is allocated to two symbols from the beginning of the subframe; the first symbol is the first-half preamble, and the second symbol is the second-half preamble. The reference preamble pattern "PtnA" is allocated to the first-half preamble. To the second-half preamble, one among the bit-expanded preamble patterns "PtnB" to "PtnD" is allocated according to a fixed order. In the example of FIG. 11B, in the first subframe, the combination of the reference preamble pattern "PtnA" and the 1-bit expanded preamble pattern "PtnB" is allocated. In the second subframe, the combination of the reference preamble pattern "PtnA" and the 2-bit expanded preamble pattern "PtnC" is allocated. And in the third subframe, the combination of the reference preamble pattern "PtnA" and the 3-bit preamble pattern "PtnD" is allocated.

In the second embodiment, one among three preamble patterns was allocated to the one symbol at the beginning of one subframe, and the reception apparatus 100 extracted synchronization timing using different preamble patterns in each frame. If the synchronization timing can be extracted in each subframe, then the reception apparatus 100 can extract the synchronization timing in a subframe interval. However, there are cases in which, for example, the reception apparatus 100 can extract the symbol synchronization timing using the preamble pattern of the first subframe, but due to multipath fading or some other cause, cannot extract the synchronization timing in the second or later subframes.

In such a case, the reception apparatus 100 uses the symbol synchronization timing extracted in the first subframe in the second and later subframes. However, often for example the type of oscillators used within the base station (or reception apparatus 100) and terminal (or transmission apparatus 200) are different, and the frequency precision is higher for the base station than for the terminal. In such cases, the effect of frequency deviation between the base station and the terminal (or the reception apparatus 100 and the transmission apparatus 200) grows larger with the passage of time. For example, there are cases in which the synchronization timing extracted using the preamble pattern of the third subframe, and the synchronization timing of the third subframe when the synchronization timing extracted in the first subframe is used without modification, are different.

Hence as explained above, subframes are generated using combinations, in one subframe, of the reference preamble pattern "PtnA" and one among the expanded bit patterns "PtnB" to "PtnD". By this means, when for example the synchronization timing is extracted in the reception apparatus 100 using the reference pattern "PtnA", in the next subframe also the synchronization timing can be extracted using the reference pattern "PtnA". In this case, synchronization timing is obtained at each subframe, and compared with the second embodiment, there is a greater possibility that a situation can be avoided in which the synchronization timing cannot be obtained for a particular subframe.

Next, an example of the configuration of the transmission apparatus 200 in the third embodiment is explained. FIG. 12 illustrates an example of the configuration of the transmission apparatus 200. The transmission apparatus 200 further comprises a symbol counter 216. The symbol counter 216 counts the number of symbols, and outputs the count value to the framer 201 and to the selector 224 of the preamble generation unit 220 with the timing of the beginning of the symbol timing.

The selector 224 outputs two preamble patterns based on the count value from the symbol counter 216 and the count value from the subframe counter 215. For example, when the count value of the first subframe and the count value of the first symbol are input, the selector 224 selects and outputs the reference preamble pattern "PtnA". And when the count value of the first subframe and the count value of the second symbol are input, the selector 224 selects and outputs the 1-bit expanded preamble pattern "PtnB". Further, when the count value of the second subframe and the count value of the first symbol are input, the selector 224 selects and outputs the 2-bit expanded preamble pattern "PtnB", and similar.

On the other hand, the framer 201 also generates a subframe such that, based on the count value from the symbol counter 216 and the count value from the subframe counter 215, preamble patterns appear in the first-half preamble and in the second-half preamble. For example, when the count value for the first subframe and the count value for the first symbol are input, the framer 201 allocates the reference preamble "PtnA" output from the selector 224 to the first-half preamble of the first subframe. And then, when the count value for the second symbol is input, the framer 201 allocates the 1-bit expanded preamble pattern "PtnB" output from the selector 224 to the second-half preamble of the first subframe.

Hence operation of the transmission apparatus 200 can be executed similarly to the example of operation illustrated in FIG. 9 for the second embodiment. In this case, the transmission apparatus 200 may allocate two symbols' worth of preamble patterns to one subframe when generating subframes (S12).

Figure 10:
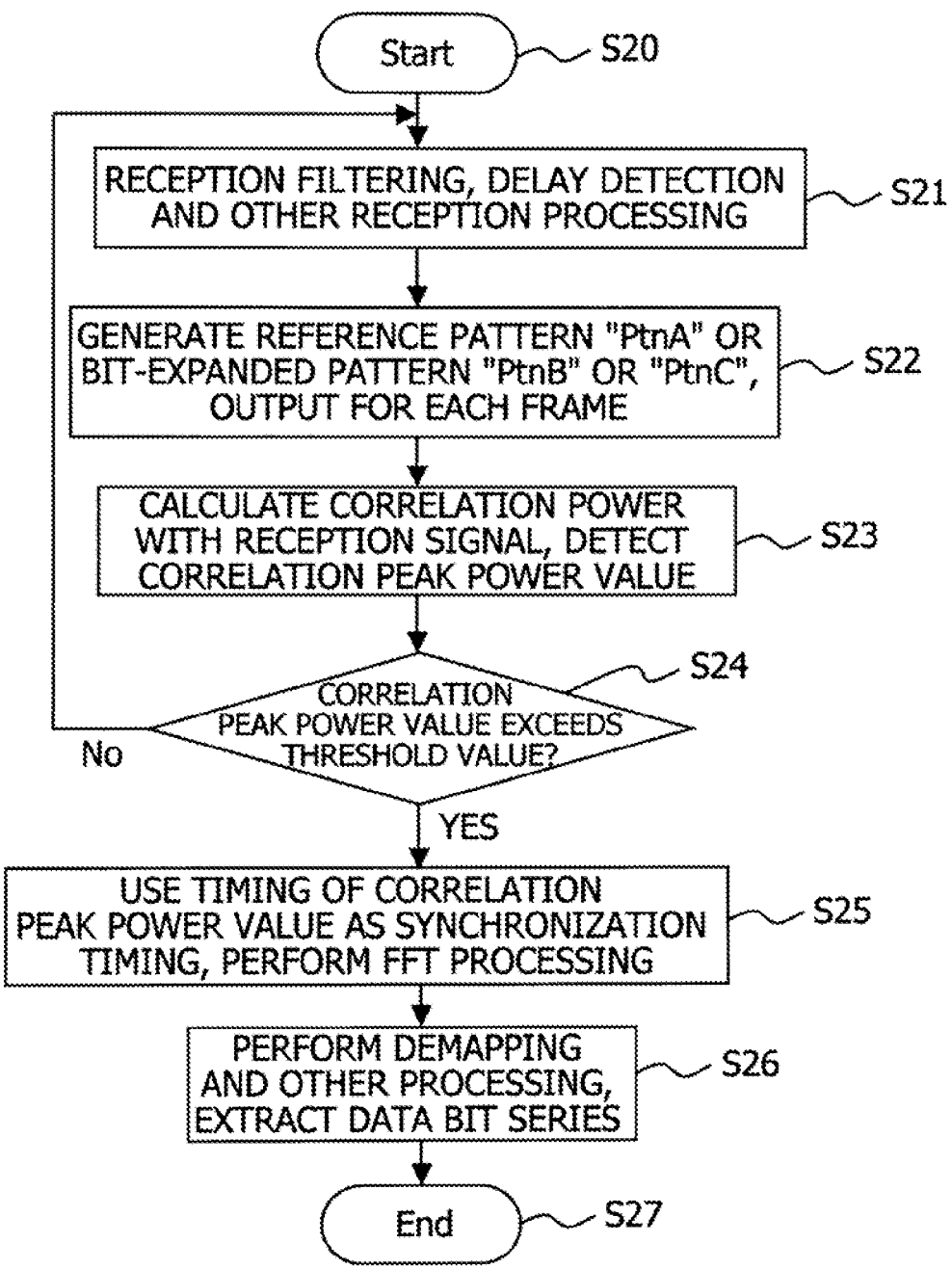
FIG. 10 is a flowchart illustrating an example of operation of a reception apparatus.

On the other hand, the reception apparatus 100 can be implemented similarly to the second embodiment. An example of the configuration of the reception apparatus 100 is for example as illustrated in FIG. 4; the correlation power is calculated using the reference preamble pattern "PtnA" in the initial radio frame interval, and in the next radio frame interval the correlation power is calculated using the 1-bit expanded preamble pattern "PtnB". Hence the reception apparatus 100 can operate as for example in the operation example illustrated in FIG. 10.

In the third embodiment also, similarly to the second embodiment, preamble patterns "PtnB" to "PtnD", for which peak power occurs in subcarriers or at frequencies different from those for the reference preamble pattern "PtnA", are used. Hence even in an environment in which a particular frequency or subcarrier is affected by multipath fading, the reception apparatus 100 can obtain the reception synchronization timing by means of one among for example three preamble patterns with different frequency components.

Further, in the third embodiment, compared with the second embodiment, the number of preamble patterns allocated to one subframe is greater, and consequently the synchronization timing can be obtained more quickly.

Fourth Embodiment

Next, a fourth embodiment is explained. In the third embodiment, an example was explained in which different preamble patterns "PtnA" to "PtnD" were allocated in two symbols of one subframe. In this case, for example when the synchronization timing is obtained using the first-half preamble, the reception apparatus 100 does not use the second-half preamble, and when the synchronization timing is obtained using the second-half preamble, the first-half preamble is not used. In this case, despite the fact that two symbols' worth of preamble patterns are provided, one of the preamble patterns is not used, and the energy of the first-half or the second-half preamble pattern is not used. The fourth embodiment is an example in which, by using two symbols' worth of energy, the reception apparatus 100 improves the C/N (Carrier to Noise) ratio, and compared with a case in which one symbol's worth of energy is used, a sharp correlation peak power is obtained and synchronization characteristics are improved.

Figure 13:
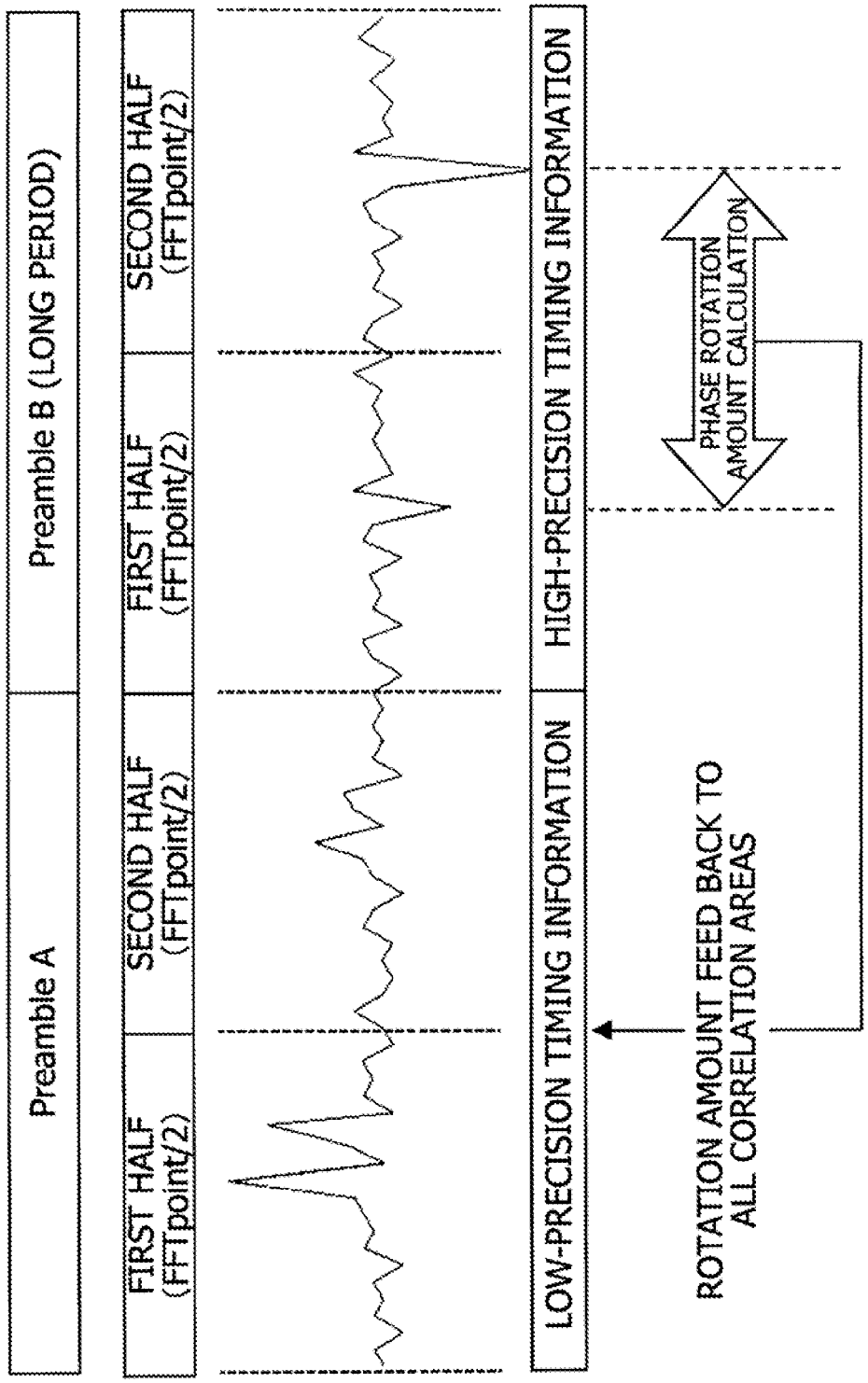
FIG. 13 illustrates an example of transition of the correlation voltage in a preamble section.

An example of operation in this fourth embodiment is explained using FIG. 13. In FIG. 13, the horizontal axis represents time and the vertical axis represents correlation voltage; the figure illustrates an example of transitions in the correlation voltage of the first-half preamble (for example, a reference preamble pattern "PtnA") and the second-half preamble (for example, a 1-bit expanded preamble pattern "PtnB"). In this case, it is assumed that the reception apparatus 100 obtains the synchronization timing using the preamble pattern of the second-half preamble.

The reception apparatus 100 divides the interval of the second-half preamble from which the synchronization timing was obtained into a first half and a second half. In this case, in the first-half interval the correlation voltage of one-half the period (first half) of the preamble pattern allocated to the second-half preamble is obtained, and in the second-half interval the correlation voltage of one-half the period (second half) of the preamble pattern is obtained.

If there is no frequency deviation in the received preamble signal of the second-half preamble, then the first-half correlation peak voltage and the second-half correlation peak voltage can take the same value. On the other hand, if there is frequency deviation in the received preamble signal of the second-half preamble, then the two correlation peak voltages can take different values. Hence the reception apparatus 100 computes the phase rotation amount from the difference in each of the correlation peak voltages for the first and second halves, and estimates the frequency deviation. And, the reception apparatus 100 feeds back the phase rotation amount to the first-half preamble, and causes phase rotation of the correlation voltage by the amount of the phase rotation. Further, the reception apparatus 100 causes phase rotation of the correlation voltage by the amount of the phase rotation for the second-half preamble as well. By this means, a phase voltage can be obtained with the frequency deviation removed.

Figure 14A:
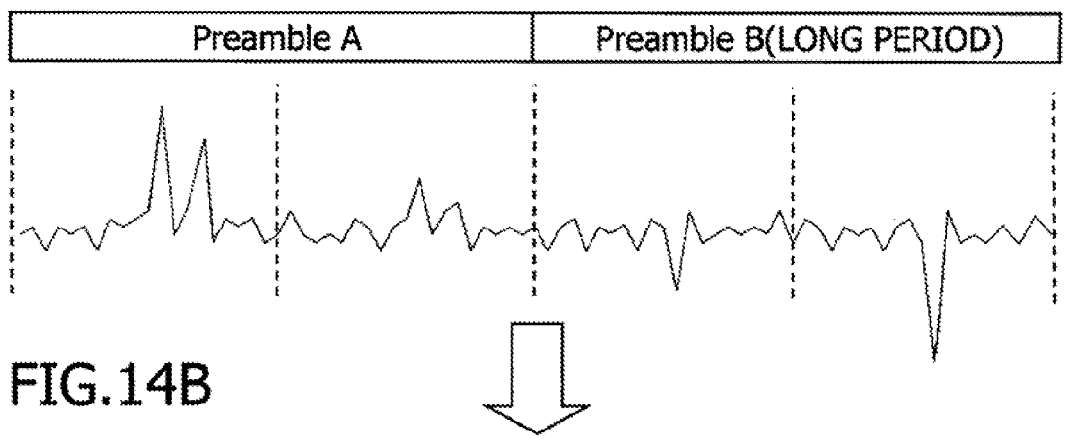
FIG. 14A illustrates an example of transition of the correlation voltage in a preamble section.
Figure 14B:
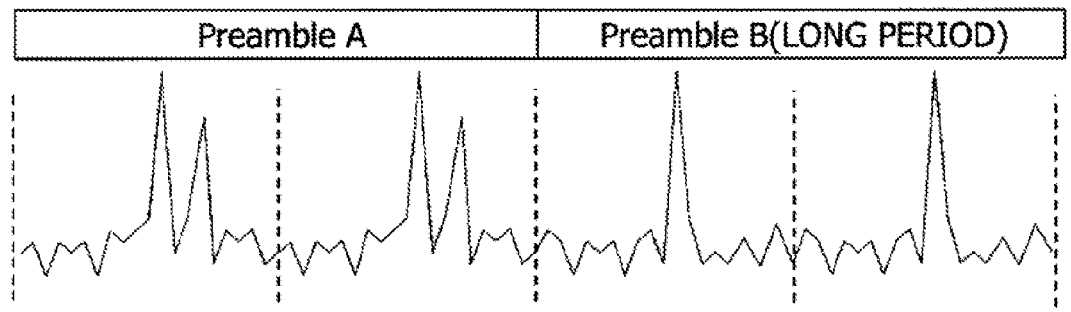
FIG. 14B illustrates an example of transition of the correlation voltage in a preamble section.

FIG. 14A and FIG. 14B respectively illustrate examples of transitions in the correlation voltage before removing frequency deviation, and after removing frequency deviation. As illustrated in FIG. 14B, in the correlation voltage with the frequency deviation removed, the correlation peak voltage is sharp compared with prior to removal.

In the fourth embodiment, moreover, integration processing of the correlation voltage with frequency deviation removed is performed. By this means, for example two symbols' worth of energy is used, and compared with a case in which integration processing is not performed, a still sharper correlation peak voltage is obtained, so that as a result the C/N is improved and the reception synchronization characteristic can also be improved.

Next, an example of the configuration of the fourth embodiment is explained. In the fourth embodiment, similarly to the second and third embodiments, the transmission apparatus 200 and reception apparatus 100 can be implemented as in the configuration examples illustrated in FIG. 3 and FIG. 4. In the fourth embodiment, the above-described phase rotation amount computation and similar is performed in the correlator 107 of the reception apparatus 100.

FIG. 15 illustrates an example of the configuration of the correlator 107 in the reception apparatus 100. The correlator 107 comprises first and second correlation computation units 131 and 132, a power conversion unit 133, a peak detection unit 134, a buffer 135, a phase comparison unit 136, a phase rotation unit 137, a voltage integration unit 138, and a power conversion unit 139.

The first correlation computation unit 131 computes the correlation voltage of for example the in-phase component of the reception signal output from the multiplier 106 (I CH or I signal), and a preamble pattern "PtnA" to "PtnD" output from the reference signal generation unit 120.

In the first to third embodiments, no differentiation between the preamble patterns "PtnA" to "PtnD" was made in order to simplify the explanation, but there are, for example, preamble patterns "PtnA" to PtnC" for I signal, and preamble patterns "PtnA" to "PtnC" for quadrature components of the reception signal (Q CH or Q signal). For example, the selector 125 outputs preamble patterns "PtnA" to "PtnC" for I signal and preamble patterns "PtnA" to "PtnC" for Q signal. Further, the framer 201 of the transmission apparatus 200, upon allocating a preamble pattern "PtnA" to "PtnD" to the beginning symbol of a subframe, allocates both a preamble pattern "PtnA" to "PtnC" for I signal and a preamble pattern "PtnA" to "PtnC" for Q signal. The first correlation computation unit 131 computes the correlation voltage of, for example, the received I signal preamble pattern "PtnA" to "PtnC" and the I signal preamble pattern "PtnA" to "PtnC" output from the reference signal generation unit 120.

The correlation voltage of FIG. 13 to FIG. 14B illustrates, for example, the correlation voltage for preamble patterns for I signal (hereafter called the I signal correlation voltage). The correlation voltage for preamble patterns for Q signal (hereafter called the Q signal correlation voltage) makes transitions so as to become the correlation peak voltage with the same timing as the I signal correlation voltage. In this case, when for example the correlation peak voltage of the I signal correlation voltage is in a first half (for example, the first half of the second-half preamble), the correlation peak voltage of the Q signal correlation voltage is in the second half (for example, the second half of the second-half preamble). For example, the I signal correlation voltage and the Q signal correlation voltage peak in different intervals in the first half and second half.

The second correlation computation unit 132 computes the correlation voltage of the Q signal output from the multiplier 106 and the Q signal preamble pattern "PtnA" to "PtnD" output from the reference signal generation unit 120. The first correlation computation unit 131 may be used for Q signal and the second correlation computation unit 132 may be used for I signal as well.

Figure 16:
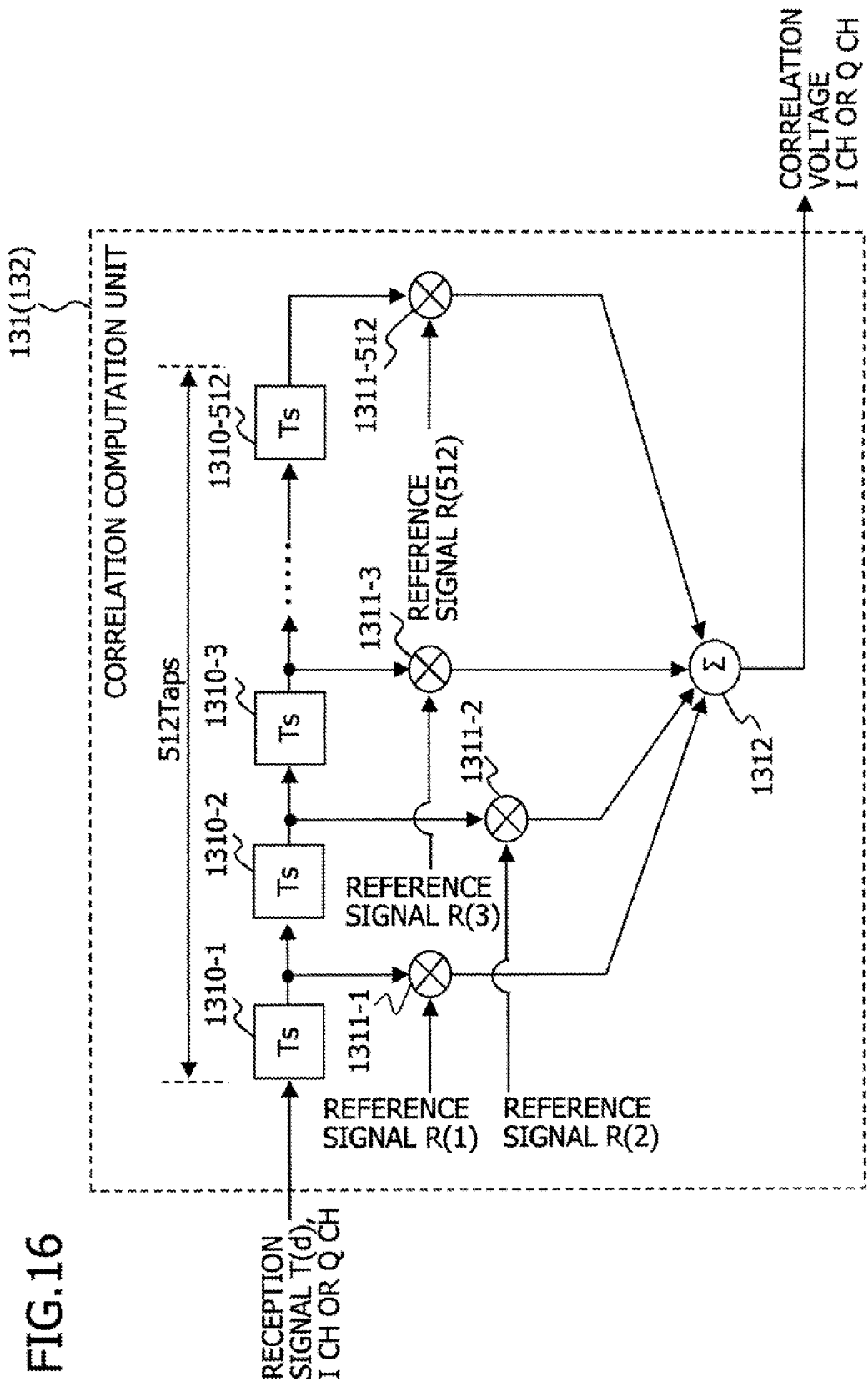
FIG. 16 illustrates an example of the configuration of a first correlation calculator.

Next, an example of the configuration of the first and second correlation computation unit 131, 132 is explained. FIG. 16 illustrates an example of the configuration of the first correlation computation unit 131. The second correlation computation unit 132 differs only in whether the preamble patterns and reception signal input are for I signal or for Q signal, and so an explanation is omitted.

The first correlation computation unit 131 comprises first to 512th delays 1310-1 to 1310-512; first to 512th multipliers 1311-1 to 1311-512; and an adder 1312. The first to 512th delays 1310-1 to 1310-512, first to 512th multipliers 1311-1 to 1311-512, and adder 1312 are configured similarly to a FIR filter, for example.

For example, I signal samples are delayed, by sample, by the first to 512th delays 1310-1 to 1310-512, and the delayed samples are multiplied with an I signal preamble pattern "PtnA" to "PtnD" by the first to 512th multipliers 1311-1 to 1311-512. The multiplied samples are added in order by the adder 1312, and the correlation voltage value for I signal is output from the first correlation computation unit 131. The number of taps is for example sufficient for the number of bits included in one symbol (512 bits), and so the first correlation computation unit 131 outputs 512 correlation voltage values as the correlation voltage values for I signal. The second correlation computation unit 132 outputs, for example, 512 Q signal correlation voltage values.

Figure 17:
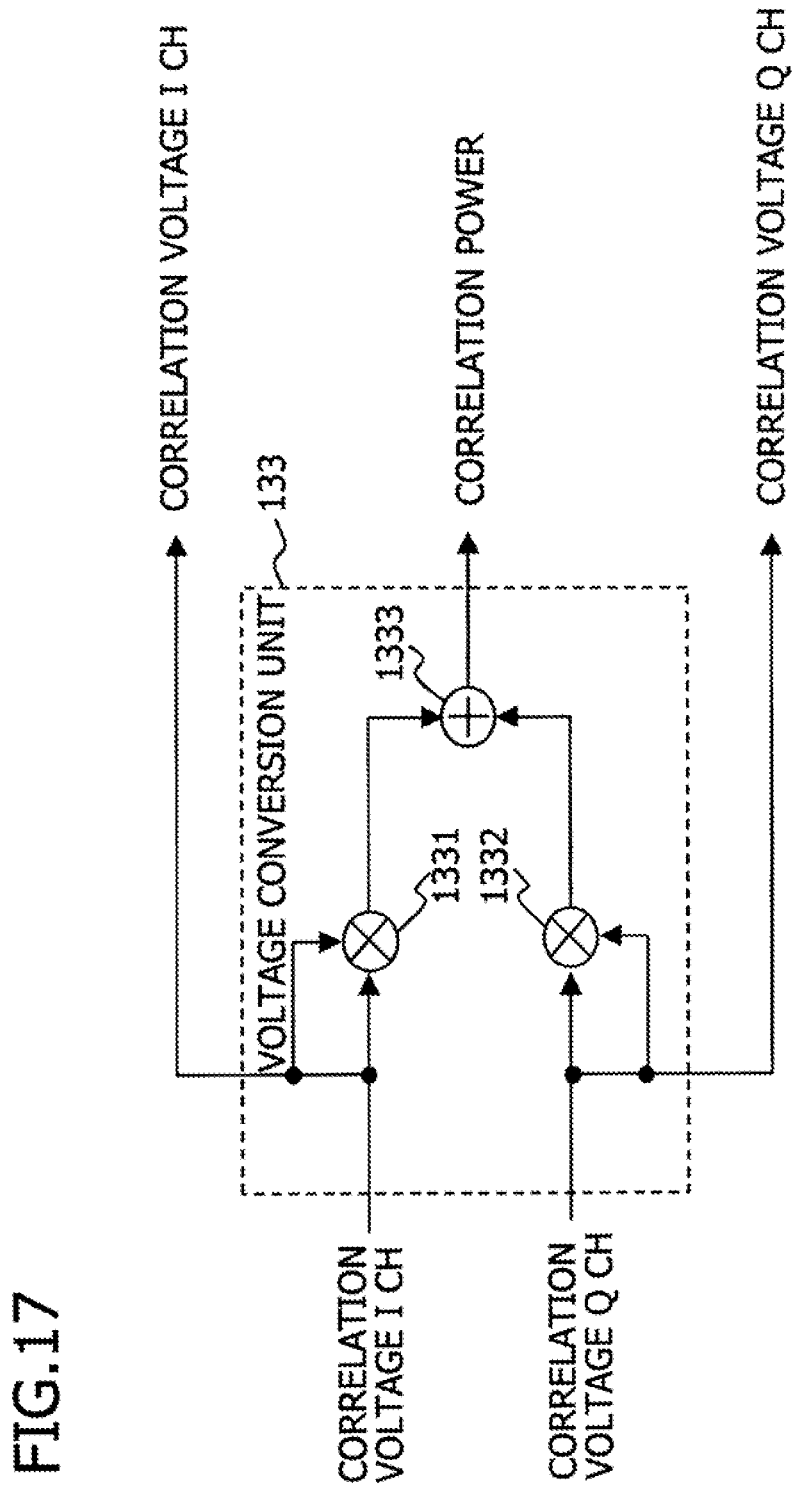
FIG. 17 illustrates an example of the configuration of a voltage conversion unit.

Returning to FIG. 15, the power conversion unit 133 converts the I signal correlation voltage values and Q signal correlation voltage values into correlation powers. FIG. 17 illustrates an example of the configuration of the power conversion unit 133.

The power conversion unit 133 comprises two multipliers 1331, 1332 and an adder 1333. The two multipliers 1331, 1332 respectively multiply the I signal and Q signal correlation voltage values, and the adder 1333 adds the two multiplied correlation voltage values and outputs the correlation power.

Returning to FIG. 15, the power conversion unit 133 outputs the converted correlation power to the peak detection unit 134.

The peak detection unit 134 is for example configured similarly to the peak detection unit 108, and detects the correlation peak power at which the correlation power is maximum in a prescribed interval, such as one radio frame interval. Here, the peak detection unit 134 may for example detect, for preamble patterns allocated to the first-half preamble and second-half preamble, in which of these the correlation peak power was obtained, and may output the result to the buffer 135.

The buffer 135 stores the I signal correlation voltage and Q signal correlation voltage output respectively by the first and second correlation computation units 131, 132, and stores information on the preamble, for which the correlation peak power was obtained (first-half preamble or second-half preamble), output from the peak detection unit 134.

The phase comparison unit 136 divides the preamble in which the correlation peak power was obtained into the first half and second half, and computes the phase rotation amount from the correlation peak voltage for each. For example, the phase comparison unit 136 reads information for the preamble from which the correlation peak power was obtained from the buffer 135, and reads the I signal correlation voltage and Q signal correlation voltage for this preamble from the buffer 135. The phase comparison unit 136 then divides the preamble for which the correlation peak power was obtained into a first half and a second half, and extracts the correlation peak voltage for the first-half I signal correlation voltage and the correlation peak voltage for the second-half I signal correlation voltage. Further, the phase comparison unit 136 determines the I signal phase rotation amount from the difference between the extracted first-half I signal correlation peak voltage and the second-half I signal correlation peak voltage. Similarly for the Q signal correlation voltage, the phase comparison unit 136 determines the Q signal phase rotation amount from the difference between the first-half correlation peak voltage and the second-half correlation peak voltage. The phase comparison unit 136 outputs the I signal phase rotation amount and the Q signal phase rotation amount.

The phase rotation unit 137 performs phase rotation of the I signal correlation voltage red from the buffer 135 by the I signal phase rotation amount output from the phase comparison unit 136, and performs phase rotation of the Q signal correlation voltage read from the buffer 135 by the Q signal phase rotation amount. The phase rotation unit 137 outputs I signal correlation voltage and Q signal correlation voltage with phases rotated and frequency deviation removed. For example, FIG. 14B illustrates an example of the transition in the I signal correlation voltage (or Q signal correlation voltage) output from the phase rotation unit 137.

The voltage integration unit 138 performs integration of both the I signal correlation voltage and the Q signal correlation voltage output from the phase rotation unit 137. By means of this integration, because there are for example four correlation peak voltages in the I signal correlation voltage of FIG. 14B, four times the correlation peak voltage is obtained. The output of the voltage integration unit 138 is a still higher correlation peak voltage compared with a case in which integration is not performed. By this means, for example, a correlation peak voltage is obtained using two symbols' worth of energy.

The power conversion unit 139 outputs the correlation power from the correlation peak voltage for both the I signal and Q signal, output from the voltage integration unit 138. An example of the configuration of the power conversion unit 139 is for example illustrated in FIG. 17, similarly to that of the power conversion unit 133. The correlation power is output from for example the threshold judgment unit 109 illustrated in FIG. 4.

An example of operation in the fourth embodiment was explained above, but the transmission apparatus 200 operates for example according to the flowchart of FIG. 9, similarly to the third embodiment. In this case, in S12 the transmission apparatus 200 allocates to a two-symbol section of one subframe and transmits the reference preamble pattern "PtnA" and an expanded preamble pattern "PtnB" to "PtnD". The reception apparatus 100 operates for example according to the flowchart of FIG. 10, similarly to the third embodiment. In this case, in the processing of S23 the reception apparatus 100 determines the phase rotation amount from the correlation voltages, rotates the phase of the correlation voltages and performs integration, and detects correlation power values from the integrated correlation voltages.

Other Embodiments

Figure 18:
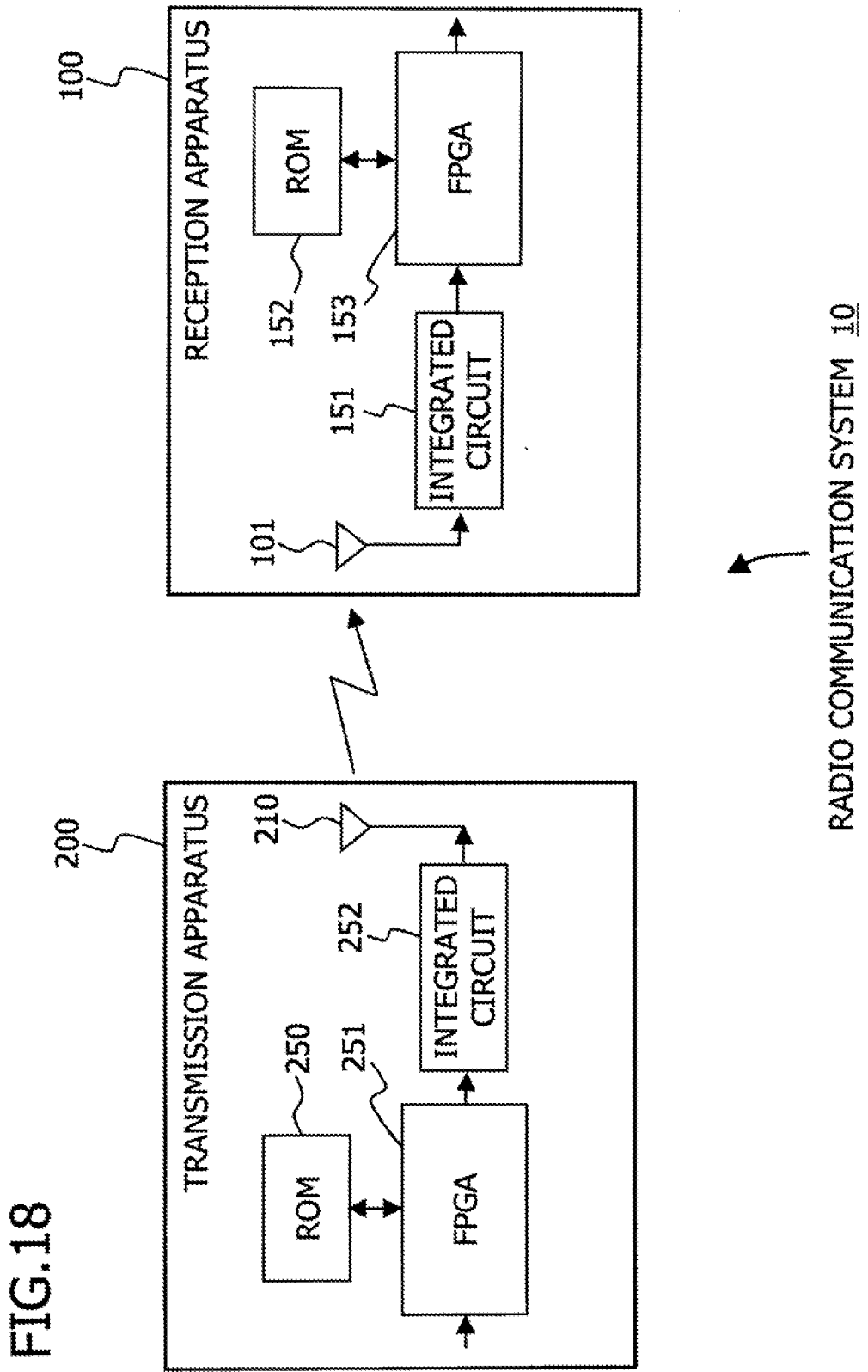
FIG. 18 illustrates an example of the configuration of a radio communication system.

Next, other embodiments are explained. In the second to the fourth embodiments, examples of the configurations of the transmission apparatus 200 and reception apparatus 100 were explained using FIG. 3 and FIG. 4 respectively. The second to fourth embodiments can be implemented using configurations other than the configuration examples illustrated in FIG. 3 and FIG. 4. FIG. 18 illustrates an example of the radio communication system 10 including examples of the configurations of a transmission apparatus 200 and reception apparatus 100.

The transmission apparatus 200 further comprises ROM (Read Only Memory) 250, a FPGA (Field-Programmable Gate Array) 251, and an integrated circuit 252. The ROM 250 stores for example information related to the circuit designs of each of the blocks from the framer 201 to the digital filter 207 illustrated in FIG. 3, the subframe counter 215, and the preamble generation unit 220 (and in the third and fourth embodiments, the symbol counter 216 as well). The FPGA 251 reads circuit design information from the ROM 250 to realize the functions of the framer 201 to the digital filter 207, the subframe counter 215, and the preamble generation unit 220 (and in the third and fourth embodiment, the symbol counter 216). The integrated circuit 252 is a circuit to realize the functions of the digital/analog conversion unit 208 and transmission filter 209. Generation of the expanded preamble patterns "PtnB" to "PtnD" explained in the second embodiment and similar, and allocation of the preamble patterns "PtnA" to "PtnD" to symbol sections, are realized by cooperative operation between the FPGA 251 and the ROM 250. Processing performed by the FPGA 251 can also be realized by a DSP (Digital Signal Processor).

On the other hand, the reception apparatus 100 further comprises an integrated circuit 151, FPGA 153, and ROM 152. The integrated circuit 151 is a circuit which realizes the various functions of the reception filter 102 and analog/digital conversion unit 103. The ROM 152 stores information relating to the circuit designs of the delay unit 104 to the demapping unit 115 and the reference signal generation unit 120. The FPGA 153 reads information relating to circuit designs from the ROM 152, and can realize the functions of the delay unit 104 to the demapping unit 115 and the reference signal generation unit 120.

The examples of configurations of the transmission apparatus 200 and reception apparatus 100 illustrated in FIG. 18 can also implement apparatuses described above in the second to fourth embodiments.

In the above-described second to fourth embodiments, explanations assumed that the transmission apparatus 200 is a terminal apparatus and that the reception apparatus 100 is a base station apparatus. For example, the second to fourth embodiments can be implemented even when the transmission apparatus 200 is a base station apparatus and the reception apparatus 100 is a terminal apparatus. In this case, in downlink communication, transmission signal are transmitted using the SC-OFDM method. Or, both a base station apparatus and a transmission apparatus may each include both a transmission apparatus 200 and a reception apparatus 100. In this case, transmission signal is transmitted and received using the SC-OFDM method in both downlink communication and in uplink communication.

Further, in the second embodiment, an example was explained in which a preamble pattern "PtnC" obtained by 2-bit expansion of a reference preamble pattern "PtnA" is allocated to the first subframe to the third subframe. Any order of allocation of preamble patterns "PtnA" to "PtnC" to each of the subframes may be used. For example, the 2-bit expanded preamble pattern "PtnC" may be allocated to the first subframe, the 1-bit expanded preamble pattern "PtnB" may be allocated to the second subframe, and the reference preamble pattern "PtnA" may be allocated to the third subframe. In this case, the reference signal generation unit 120 of the reception apparatus 100 can output the preamble patterns "PtnC" to "PtnA", in this order, to the correlator 107 for each radio frame.

Further, instead of the three preamble patterns "PtnA" to "PtnC", at least two preamble patterns among three may be used. For example, the reference preamble pattern "PtnA" may be used in the first subframe, the 1-bit expanded preamble pattern "PtnB" may be used in the second subframe, and the reference preamble pattern "PtnA" may be used in the third subframe. In this case also, the reference signal generation unit 120 of the reception apparatus 100 outputs the preamble patterns "PtnA" and "PtnB" in the above order to the correlator 107 for each radio frame.

Further, in the third embodiment, an example was explained in which the reference preamble pattern "PtnA" and the expanded preamble patterns "PtnB" to "PtnD" are allocated to two-symbol sections. For example, any two arbitrary preamble patterns among the preamble patterns "PtnA" to "PtnD" can be allocated to two-symbol sections. For example, two preamble patterns "PtnA", "PtnB" can be allocated to the first subframe, and the two different preamble patterns "PtnC", "PtnD" can be allocated to the second subframe. Further, one among the expanded preamble patterns "PtnB" to "PtnD" may be allocated to each subframe, with the remaining preamble patterns "PtnA" to "PtnD" allocated in order to each subframe to form two symbols' worth of preamble patterns. In all cases, the reference signal generation unit 120 of the reception apparatus 100 can output preamble patterns to the correlator 107 in the order of appearance of subframes.

Further, in the third embodiment, an example was explained in which two different preamble patterns "PtnA" to "PtnD" are allocated to one subframe. For example, three or more different preamble patterns may be allocated to each symbol of three or more symbols in one subframe. In this case, the number and types of preamble patterns included in one subframe are greater than in the third embodiment, so that there is a greater possibility that the synchronization timing can be obtained more quickly than in the third embodiment.

A transmission apparatus, transmission method, reception apparatus, and reception method capable of obtaining accurate synchronization timing even in a multipath fading environment can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has been described in detail, it should be understood that the various changes, substitutions, and alterations could be made hereto without departing from the spirit and scope of the invention.

What is claimed is:

1. A reception apparatus for receiving a transmission signal, as a reception signal, obtained by converting a transmission data series into a frequency-domain and converting the frequency-domain converted signal into a time-domain signal, the apparatus comprising:
a memory configured to store a first preamble pattern;
a preamble pattern generation unit configured to read the first preamble pattern from the memory, and output at least two preamble patterns among the first, second and third preamble patterns, the second and third preamble patterns including bit series in which each of bits of the first preamble pattern is continued for n bits (where n is an integer equal to or greater than 2) and for k bits (where k is an integer equal to or greater than 2, and k≠n);
a detection unit configured to detect synchronization timing based on the reception signal and the at least two preamble patterns output from the preamble pattern generation unit; and
a reception processing unit configured to perform reception processing of the reception signal in synchronization with the detected synchronization timing.

2. The reception apparatus according to claim 1, wherein one of the at least two preamble patterns output from the preamble pattern generation unit is allocated in a first subframe interval of the reception signal, and the other one of the at least two preamble patterns output from the preamble pattern generation unit is allocated in a second subframe interval following the first subframe interval, and
the preamble pattern generation unit is configured to output one of the at least two preamble patterns in a first radio frame interval, and output the other one of the at least two preamble patterns in a second radio frame interval following the first radio frame interval.

3. The reception apparatus according to claim 1, wherein one of the at least two preamble patterns output from the preamble pattern generation unit is allocated in a first symbol interval in a first subframe interval of the reception signal, and the other one of the at least two preamble patterns output from the preamble pattern generation unit is allocated in a second symbol interval in the first subframe interval following the first symbol interval, and
the preamble pattern generation unit is configured to output one of the at least two preamble patterns in a first radio frame interval, and output the other one of the at least two preamble patterns in a second radio frame interval following the first radio frame interval.

4. The reception apparatus according to claim 1, wherein one of the first to third preamble patterns is allocated in a first symbol interval in a first subframe interval of the reception signal, and one of the first to third preamble patterns other than the preamble pattern allocated to the first symbol interval is allocated in a second symbol interval in the first subframe interval following the first symbol interval,
the preamble pattern allocated to the first symbol interval is allocated in a third symbol interval of a second subframe interval following the first subframe interval, and a preamble pattern among the first to third preamble patterns not allocated to any of the symbol intervals is allocated in a fourth symbol interval in the second subframe interval following the third symbol interval, and
the preamble pattern generation unit is configured to output the preamble pattern allocated to the first symbol interval of the reception signal in a first radio frame interval, output the preamble pattern allocated to the second symbol interval of the reception signal in a second radio frame interval following the first radio frame interval, and output the preamble pattern allocated to the fourth symbol interval of the reception signal in a third radio frame interval following the second radio frame interval.

5. The reception apparatus according to claim 1, wherein the first preamble pattern is allocated in a first subframe interval of the reception signal, the second preamble pattern is allocated in a second subframe interval following the first subframe interval, and the third preamble pattern is allocated in a third subframe interval following the second subframe interval, and
the preamble pattern generation unit is configured to output the first preamble pattern in a first radio frame interval, output the second preamble pattern in a second radio frame interval following the first radio frame interval, and output the third preamble pattern in a third radio frame interval following the second radio frame interval.

6. The reception apparatus according to claim 1, wherein the detection unit is configured to calculate a correlation peak power value of the reception signal and the at least two preamble patterns output from the preamble pattern generation unit, and detect timing at which at least one correlation peak power value is obtained as synchronization timing.

7. The reception apparatus according to claim 3, wherein the detection unit is configured to detect a first correlation voltage for the preamble pattern allocated in the first symbol interval and a second correlation voltage for the preamble pattern allocated in the second symbol interval, estimate a phase rotation amount of the first or second correlation voltage based on the first or second correlation voltage, rotate a phases of the first and second correlation voltages by the phase rotation amount, and detect the synchronization timing based on the rotated first and second correlation voltages.

8. The reception apparatus according to claim 7, wherein the detection unit is configured to calculate each of integration values of the phase-rotated first and second correlation voltages, and detect the synchronization timing based on the calculated first and second correlation voltage integration values.

9. The reception apparatus according to claim 4, wherein the detection unit is configured to detect a first correlation voltage for the preamble pattern allocated in the first or third symbol interval and a second correlation voltage for the preamble pattern allocated in the second or fourth symbol interval, estimate a phase rotation amount of the first or second correlation voltage based on the first or second correlation voltage, rotate phases of the first and second correlation voltages by the phase rotation amount, and detect the synchronization timing based on the rotated first and second correlation voltages.

10. The reception apparatus according to claim 8, wherein the detection unit is configured to calculate each of the integration values of the phase-rotated first and second correlation voltages, and detect the synchronization timing based on the computed first and second correlation voltage integration values.

11. The reception apparatus according to claim 1, wherein the reception apparatus is a base station apparatus or a terminal apparatus.

12. A reception method for receiving a transmission signal, as a reception signal, obtained by converting a transmission data series into a frequency-domain and converting the frequency-domain converted signal into a time-domain signal, the method comprising:
reading a first preamble pattern stored in a memory, by a preamble pattern generation unit;
outputting at least two preamble patterns among the first, second and third preamble patterns, the second and third preamble patterns including bit series in which each of bits of the first preamble pattern is continued for n bits (where n is an integer equal to or greater than 2) and for k bits (where k is an integer equal to or greater than 2, and k≠n), by a preamble pattern generation unit;
detecting synchronization timing based on the outputting at least two preamble patterns and the reception signal, by a detection unit; and
performing reception processing of the reception signal in synchronization with the detected synchronization timing, by a reception processing unit.

13. A transmission apparatus for converting a transmission data series into frequency-domain, converting the frequency-domain converted signal into time-domain signal, and transmitting the time-domain converted signal as a transmission signal, the apparatus comprising:
a memory configured to store a first preamble pattern;
a preamble pattern generation unit configured to read the first preamble pattern from the memory, and output at least two preamble patterns among the first, second and third preamble patterns, the second and third preamble patterns including bit series in which each of bits of the first preamble pattern is continued for n bits (where n is an integer equal to or greater than 2) and for k bits (where k is an integer equal to or greater than 2, and k≠n); and
a transmission unit configured to transmit the transmission signal including the at least two preamble patterns output from the preamble pattern generation unit.

14. A transmission method for converting a transmission data series into frequency-domain, converting the frequency-domain converted signal into time-domain signal, and transmitting the time-domain converted signal as a transmission signal, the method comprising:
reading a first preamble pattern stored in a memory, by a preamble pattern generation unit;
outputting at least two preamble patterns among the first, second and third preamble patterns, the second and third preamble patterns including bit series in which each of bits of the first preamble pattern is continued for n bits (where n is an integer equal to or greater than 2) and for k bits (where k is an integer equal to or greater than 2, and k≠n), by the preamble pattern generation unit; and
transmitting the transmission signal including the at least two preamble patterns output from the preamble pattern, by a transmission unit.

* * * * *